United States Patent
Eguchi

(10) Patent No.: US 8,687,291 B2
(45) Date of Patent: Apr. 1, 2014

(54) OPTICAL SYSTEM AND IMAGE PICKUP APPARATUS

(71) Applicant: Canon Kabushiki Kaisha, Tokyo (JP)

(72) Inventor: Kaoru Eguchi, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/654,664

(22) Filed: Oct. 18, 2012

(65) Prior Publication Data

US 2013/0100337 A1 Apr. 25, 2013

(30) Foreign Application Priority Data

Oct. 24, 2011 (JP) ................................. 2011-233190

(51) Int. Cl.
*G02B 13/02* (2006.01)

(52) U.S. Cl.
USPC .......................................... 359/748; 359/745

(58) Field of Classification Search
CPC ........ G02B 9/12; G02B 13/02; H04N 5/2254; H04N 5/23248
USPC .......... 348/335, 340; 359/745, 746, 747, 748, 359/784, 785, 786, 788
See application file for complete search history.

(56) References Cited

U.S. PATENT DOCUMENTS

| 7,715,118 B2 * | 5/2010 | Kato ............................. 359/754 |
| 8,233,223 B2 * | 7/2012 | Lee ............................... 359/748 |
| 2011/0310486 A1 * | 12/2011 | Eguchi ........................ 359/570 |
| 2013/0021513 A1 * | 1/2013 | Eguchi ........................ 348/335 |
| 2013/0194487 A1 * | 8/2013 | Eguchi ........................ 348/360 |

FOREIGN PATENT DOCUMENTS

| JP | 63-106714 A | 5/1988 |
| JP | 63-194214 A | 8/1988 |

* cited by examiner

*Primary Examiner* — David N Spector
(74) *Attorney, Agent, or Firm* — Rossi, Kimms & McDowell LLP

(57) ABSTRACT

An optical system includes a first lens unit fixed during a focusing operation and having a positive refractive power, a second lens unit moving in an optical axis direction during the focusing operation and having a negative refractive power, a third lens unit positioned at the image side relative to the second lens unit and having a positive or negative refractive power, the first lens unit is configured by first, second, and third partial lens units, the first partial lens unit is configured by two positive lens components, the second partial lens unit is configured by one cemented lens having a negative combined refractive power, the third partial lens unit is positioned between the second partial lens unit and the second lens unit and has a positive refractive power as a whole, and each lens unit is configured so as to meet an appropriate condition.

20 Claims, 11 Drawing Sheets

OPTICAL SYSTEM AND IMAGE PICKUP APPARATUS

BACKGROUND OF THE INVENTION

1. Field of the Invention

The present invention relates to an optical system that is suitably used for an image pickup apparatus such as a digital still camera or a video camera using a solid-state image pickup element or a camera using a silver salt film.

2. Description of the Related Art

As an image pickup optical system of a long focal length, a so-called telephoto-type image pickup optical system (a telephoto lens) that is, in order from an object side to an image side, configured by a front lens unit having a positive refractive power and a rear lens unit having a negative refractive power is known. The long focal length, for example, means a focal length that is longer than a size of an effective image pickup range. Commonly, in the telephoto lens having a long focal length, a total lens length becomes long as the foal length is extended. When a telephoto lens which has a small F-number (an aperture ratio) is obtained, especially a lens diameter of the rear lens unit is increased.

Therefore, a telephoto lens in which the front lens unit is appropriately configured so as to have a short total lens length is proposed. In Japanese Patent Laid-Open No. 63-194214, for example, a telephoto lens having a focal length of 100 mm, an F-number of 4.5, a telephoto ratio (a ratio of a total length with respect to a focal length) of 0.68 is disclosed. In Japanese Patent Laid-Open No. 63-106714, for example, a telephoto lens having the focal length of 300 mm, the F-number of 4.6, and the telephoto ratio of 0.70 is disclosed.

As the telephoto lens commonly has a longer focal length, a whole of the lens system is enlarged. In addition, when the telephoto lens having a small F-number is obtained, the whole of the lens diameter is increased. Therefore, it is important for the telephoto lens (especially, the telephoto lens having a small F-number with respect to the focal length) to reduce the size of the whole of the lens system.

Commonly, in the telephoto lens, as the F-number is decreased or the focal length is increased, particularly the size of the front lens unit having a positive refractive power is enlarged and also the weight of the front lens unit is increased. When the refractive power of each unit is simply strengthened in order to reduce the size of the front lens unit, an amount of variation of various aberrations is increased with respect to various kinds of manufacturing errors. In this case, the manufacture is difficult since surface accuracy or assembly accuracy that is required for each lens unit (especially the front lens unit), and as a result, it is difficult to obtain a desired optical performance. Therefore, when a small-size and lightweight telephoto lens has resistance to the manufacturing error is obtained, it is important to appropriately set a configuration of the front lens unit having a positive refractive power.

However, in the configuration of the front lens unit disclosed in Japanese Patent Laid-Open No. 63-194214 or Japanese Patent Laid-Open No. 63-106714, when the total lens length is further shortened, the amount of variation of the various aberrations with respect to the manufacturing error is increased. Therefore, in the configuration of Japanese Patent Laid-Open No. 63-194214 or Japanese Patent Laid-Open No. 63-106714, a lightweight telephoto lens which has resistance to the manufacturing error and has a short total length cannot be obtained.

SUMMARY OF THE INVENTION

The present invention provides an optical system and an image pickup apparatus that are easily manufactured and that are small and lightweight.

An optical system as another aspect of the present invention, in order from an object side to an image side, includes a first lens unit configured to be fixed during a focusing operation and having a positive refractive power as a whole, a second lens unit configured to move in an optical axis direction during the focusing operation and having a negative refractive power as a whole, and a third lens unit positioned at the image side relative to the second lens unit and having a positive or negative refractive power as a whole. The first lens unit is, in order from the object side to the image side, configured by a first partial lens unit, a second partial lens unit, and a third partial lens unit, the first partial lens unit is configured by two positive lens components, the second partial lens unit is configured by one cemented lens having a negative combined refractive power configured by cementing at least one positive lens and one negative lens, or configured by one positive lens and one negative lens having a negative combined refractive power, the third partial lens unit is positioned between the second partial lens unit and the second lens unit, the third partial lens unit having a positive refractive power as a whole, and each lens unit is configured so as to meet an appropriate condition.

An image pickup apparatus as another aspect of the present invention includes the optical system and an image pickup element configured to receive light of an image formed by the image pickup optical system.

Further features and aspects of the present invention will become apparent from the following description of exemplary embodiments with reference to the attached drawings.

DESCRIPTION OF THE PREFERRED EMBODIMENTS

Figure 1A:
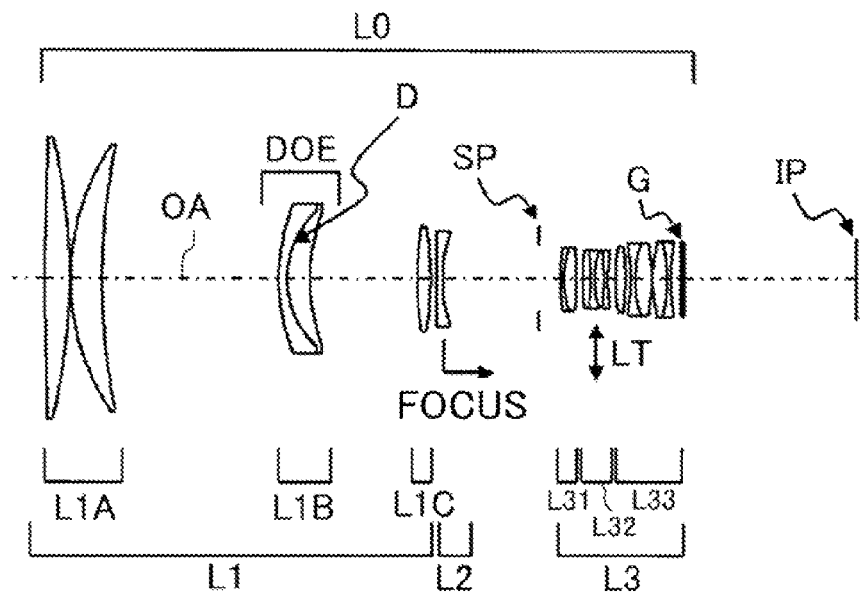
FIGS. 1A and 1B are a cross-sectional diagram and an aberration diagram of an optical system in a state where an object distance is at infinity in Embodiment 1, respectively.
Figure 1B:
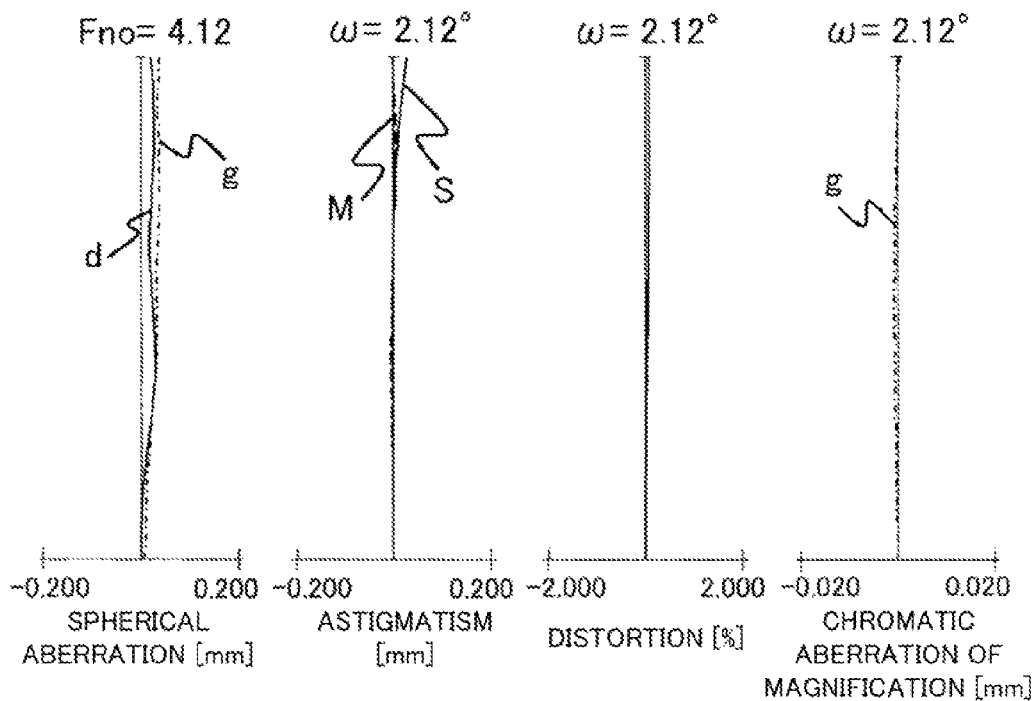

Exemplary embodiments of the present invention will be described below with reference to the accompanied drawings. In each of the drawings, the same elements will be denoted by the same reference numerals and the duplicate descriptions thereof will be omitted.

An optical system (an image pickup optical system) of the present embodiment, in order from an object side to an image side, includes a first lens unit L1 that has a positive refractive power, a second lens unit L2 that moves in a direction of an optical axis OA (in an optical axis direction) so as to perform a focusing and that has a negative refractive power, and a third lens unit L3 that has a positive or a negative refractive power. The focusing means an operation of focusing on an infinite object or a finite object.

Figure 9A:
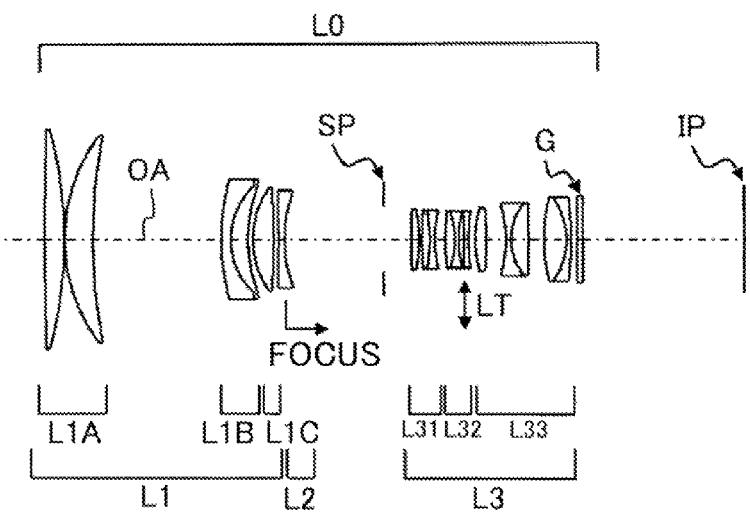
FIGS. 9A and 9B are a cross-sectional diagram and an aberration diagram of an optical system in a state where an object distance is at infinity in Embodiment 9, respectively.
Figure 9B:
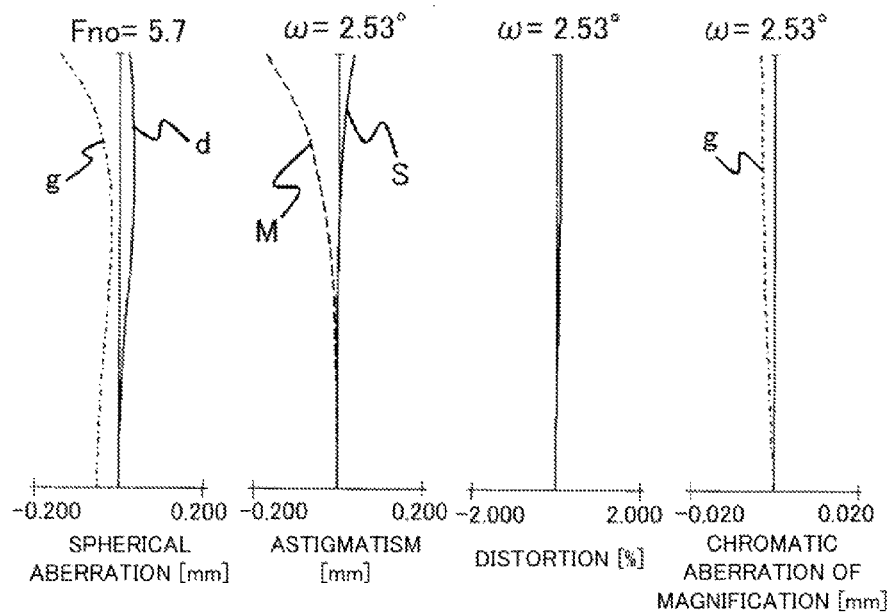
Figure 10A:
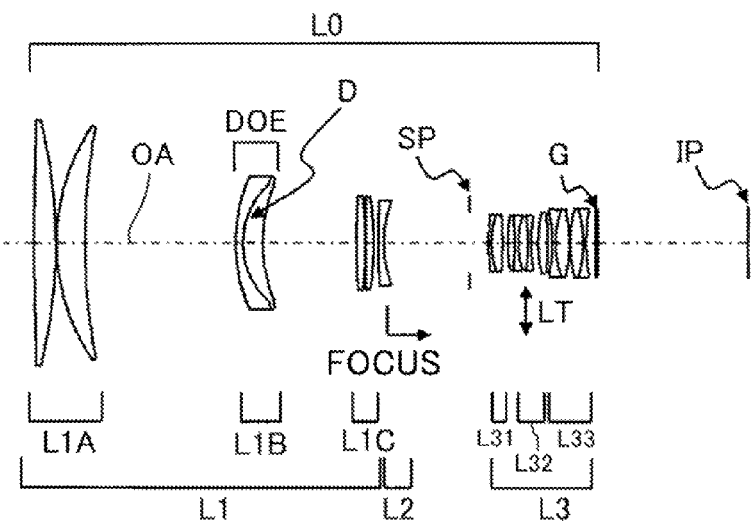
FIGS. 10A and 10B are a cross-sectional diagram and an aberration diagram of an optical system in a state where an object distance is at infinity in Embodiment 10, respectively.
Figure 10B:
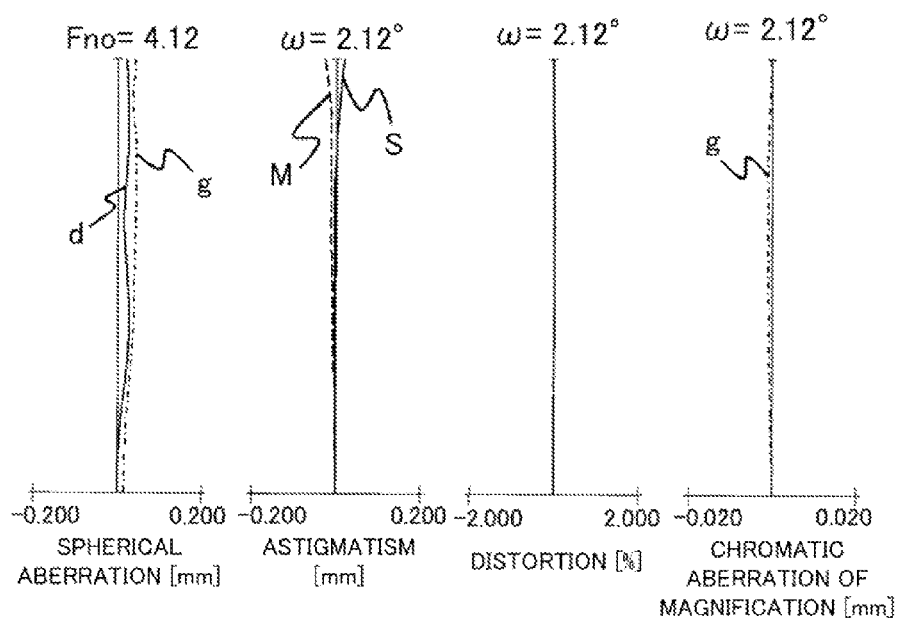
Figure 11:
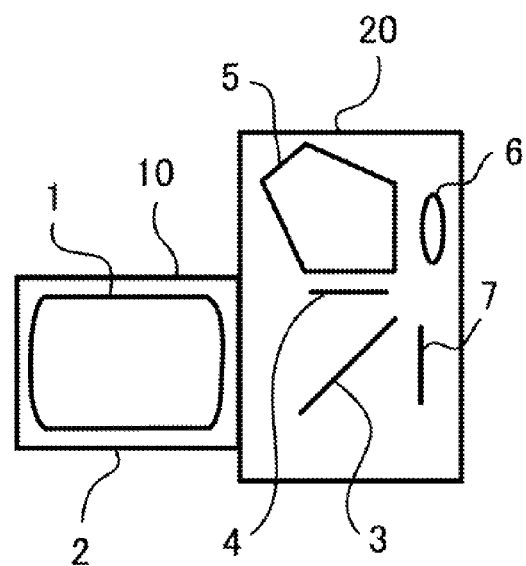
FIG. 11 is a schematic configuration diagram of an image pickup apparatus in each of the embodiments.
Figure 12:
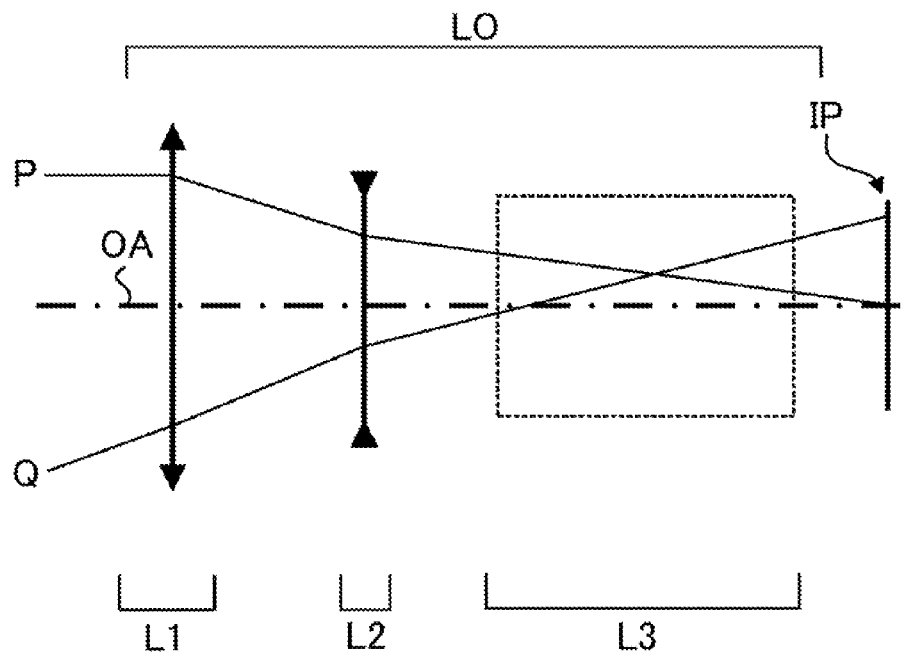
FIG. 12 is a diagram of describing an optical function in each of the embodiments.

FIG. 1A to FIG. 10B are cross-sectional diagrams (FIGS. 1A, 2A, 3A, 4A, 5A, 6A, 7A, 8A, 9A, and 10A) and longitudinal aberration diagrams (FIGS. 1B, 2B, 3B, 4B, 5B, 6B, 7B, 8B, 9B, and 10B) of the optical system in a state where an object distance is at infinity in Embodiments 1 to 10 of the present invention, respectively. FIG. 11 is a schematic configuration diagram of a single-lens reflex camera system (an image pickup apparatus) that is configured by mounting the optical system in the present embodiment on a camera body (an image pickup apparatus body). FIG. 12 is a diagram of an optical function (a schematic diagram of paraxial arrangement) in the present embodiment.

In each cross-sectional diagram of FIGS. 1A to 10A, reference symbol L0 denotes an image pickup optical system (the optical system). Reference symbol SP denotes an aperture stop. The image pickup optical system L0 is configured by including the first lens unit L1 that has a positive refractive power, the second lens unit L2 that has a negative refractive power, and the third lens unit L3 that has a positive or a negative refractive power. The first lens unit L1 is, in order from the object side to the image side, configured by a fixed first partial lens unit L1A, a fixed second partial lens unit L1B, and a fixed third partial lens unit L1C. Reference symbol IP denotes an image plane. When the optical system of the present embodiment is used as the image pickup optical system of a video camera or a digital camera, the image plane IP corresponds to an imaging plane of an image pickup element (a photoelectric conversion element) such as a CCD sensor or a CMOS sensor that receives a light of an image formed by this optical system. On the other hand, when the optical system is used as the image pickup optical system of a silver salt film camera, the image plane IP corresponds to a film surface.

In each of the aberration diagrams of FIGS. 1B to 10B, reference symbol d denotes a d-line, and reference symbol g denotes a g-line. Reference symbol M denotes a meridional image plane, and reference symbol S denotes a sagittal image plane. A chromatic aberration of magnification is indicated by the g-line. Reference symbol Fno denotes an F-number, and reference symbol ω denotes a half angle of field. In all the aberration diagrams, on condition that each numerical example described below is indicated by a unit of millimeter (mm), they are depicted by scales of a spherical aberration of 0.2 mm, astigmatism of 0.2 mm, distortion of 2%, and a chromatic aberration of magnification of 0.02 mm.

The image pickup optical system L0 of each embodiment is a telephoto lens, and for example has a first characteristic and a second characteristic as described below. The optical system having the first characteristic, in order from the object side to the image side, has the first lens unit L1, the second lens unit L2, and the third lens unit L3. The first lens unit L1 is fixed during the focusing operation, and has a positive refractive power as a whole. The second lens unit L2 moves in the optical axis direction during the focusing operation, i.e. moves to the image side during the focusing on a closer object, and has a negative refractive power as a whole. The third lens unit L3 is positioned at the image side relative to the second lens unit L2, and has a positive or a negative refractive power as a whole. The first lens unit L1 is, in order from the object side to the image side, configured by the first partial lens unit L1A, the second partial lens unit L1B, and the third partial lens unit L1C. The first partial lens unit L1A is configured by two positive lens components. The second partial lens unit L1B is configured by one cemented lens in which at least one positive lens and one negative lens are cemented so as to have a negative combined refractive power, or configured by one positive lens and one negative lens that have a negative combined refractive power. The third partial lens unit L1C is positioned between the second partial lens unit L1B and the second unit L2, and has a positive refractive power as a whole. The optical system meets the following Conditional Expressions (1) to (5).

$$-3.00 < f_{1B}/f_1 < -0.20 \quad (1)$$

$$0.50 < f_{1C}/f_1 < 2.50 \quad (2)$$

$$0.40 < f_{1A}/f_{1C} < 2.50 \quad (3)$$

$$0.20 < f_{12}/f < 3.00 \quad (4)$$

$$0.10 < d_{1AB}/d_1 < 0.80 \quad (5)$$

In the conditional expressions, symbol f is a focal length of a total system when focusing on infinity, symbol $f_1$ is a focal length of the first lens unit L1, symbol $f_{1A}$ is a focal length of the first partial lens unit L1A, symbol $f_{1B}$ is a focal length of the second partial lens unit L1B, and symbol $f_{1C}$ is a focal length of the third partial lens unit L1C. Symbol $f_{12}$ is a combined focal length of the first lens unit L1 and the second lens unit L2 when focusing on infinity. Symbol $d_1$ is a distance on the optical axis from a lens which is positioned closest to the image side of the first lens unit L1 from an apex of a surface at the object side of a lens positioned closest to the object side of the first lens unit L1. Symbol $d_{1AB}$ is an interval between the first partial lens unit L1A and the second partial lens unit L1B.

The optical system having the second characteristic, in order from the object side to the image side, has the first lens unit L1, the second lens unit L2, and the third lens unit L3. The first lens unit L1 is fixed during the focusing operation, and has a positive refractive power as a whole. The second lens unit L2 moves in the optical axis direction during the focusing operation, i.e. moves to the image side when focusing on a closer object from a state of focusing on infinity, and has a negative refractive power as a whole. The third lens unit L3 is positioned at the image side relative to the second lens unit L2, and has a positive or a negative refractive power as a whole. The first lens unit L1 is, in order from the object side to the image side, configured by the first partial lens unit L1A, the second partial lens unit L1B, and the third partial lens unit L1C. The first partial lens unit L1A is configured by two positive lens components. The second partial lens unit L1B is configured by one cemented lens in which at least one positive lens and one negative lens are cemented so as to have a negative combined refractive power, or configured by one positive lens and one negative lens that have a negative combined refractive power. The third partial lens unit L1C is positioned between the second partial lens unit L1B and the second unit L2, and has a positive refractive power as a whole. The optical system meets the following Conditional Expressions (6) and (7).

$$0.20 < f_1 \times L \times Fno/f^2 < 1.30 \tag{6}$$

$$0.50 < \left| \prod_{i=1}^{L1num} \beta_i \right| \times \frac{L}{f} < 9.00 \tag{7}$$

In the conditional expression, symbol f is a focal length of the total system when focusing on infinity, symbol $f_1$ is a focal length of the first lens unit L1, and symbol L is a length from an apex of a surface closest to the object side of the optical system to an image plane. Symbol Fno is a full open F-number when focusing on an infinity object, and L1num is a sum of the number of lens components from the first partial lens unit L1A to the second partial lens unit L1B. Symbol $\beta_i$ is a combined lateral magnification (a lateral magnification) of all lenses at the image side relative to an i-th lens component in order from the object side when focusing on the infinity object.

In the telephoto lens (the optical system) as illustrated in the model of FIG. 12, a height of an axial paraxial ray incident on the lens is high at the object side relative to a point at which the optical axis OA intersects with a pupil paraxial ray, and is low at the image side relative to the point. Thus, the telephoto lens has a so-called telephoto-type configuration. In this case, when an aperture ratio is increased, i.e. the F-number is decreased, the full open F-number is determined by a lens diameter near the object side, and an effective diameter of a lens closer to the object side of the telephoto lens becomes large. In particular, as the F-number is decreased, the effective diameter of the lens is increased, and according to this, the outer diameter of the lens is increased and also the weight is increased with substantially the cube of the increase of the diameter. Therefore, as the telephoto lens has a larger aperture ratio, the weight of the lens at the object side tends to be increased compared to that at the image side. Thus, in the telephoto lens having a large aperture ratio, it is important to reduce the weight of the total system. In order to reduce the weight of whole of the lens system in such a situation, it is necessary to shorten a total lens length, i.e. a distance from the first lens surface to the image plane, without changing a specification or an imaging performance, reduce the number of the lenses constituting the first lens unit, or reduce the size of the effective diameter of the lens.

In each embodiment described below, in the optical system having such configurations, in order to reduce the weight of whole of the lens system, first of all, the total lens length is shortened. As this method, for example, there is a method of strengthening the refractive power of the first lens unit L1 having the positive refractive power or thinning a thickness, i.e. a length in the optical axis direction, of the lens unit of the first lens unit L1 itself. Generally, however, in the telephoto lens which has an F-number smaller than the focal length (for example, f/Fno>70), the spherical aberration or coma aberration is increased compared to that of the telephoto lens having a large F-number (for example, 70>f/Fno). Therefore, in a conventional telephoto lens, the number of the lenses of the first lens unit L1 is increased so as to perform an aberration correction.

Next, a method of shortening the total lens length in the telephoto lens having a small F-number (the full open F-number) compared to the focal length (for example, f/Fno>70) will be considered. As one of methods capable of easily shortening the total length, there is a method of strengthening the refractive power of the first lens unit L1. However, if the total lens length is only shortened by simply strengthening the refractive power of the first lens unit L1, the thickness (the center thickness) of the positive lens is increased. Therefore, the weight of the first lens unit L1 is increased, and in the telephoto lens having a small F-number, the effect of reducing the weight that is appropriate for shortening the total lens length cannot be obtained. In addition, since the number of the lenses is large, an air gap to shorten the total lens length is narrow, and a sufficient effect of shortening the total lens length cannot be obtained if the refractive power is over a certain level.

Accordingly, in each embodiment, at least one lens surface having an aspherical shape is disposed in the first lens unit L1 so as to appropriately maintain the optical characteristics, and the number of the lenses of the first lens unit L1 is reduced so as to thin the lens unit thickness of the first lens unit L1. Furthermore, the refractive power of the first lens unit L1 is strengthened so as to shorten the total lens length. In this case, when the total length is shortened in the telephoto lens having a long focal length f and a small F-number Fno (for example, f/Fno>70), the following problem is generated. In the embodiment, the telephoto lens is, for example a lens having a focal length of f=500 mm and an F-number of Fno=4.0. The present embodiment can also adopt a lens having a focal length of f=500 mm and an F-number of Fno=5.6, a lens having a focal length of f=600 mm and an F-number of Fno=4.0, or a lens having a focal length of f=800 mm and an F-number of Fno=5.6 as a telephoto lens.

When the refractive power of whole of the first lens unit L1 is simply strengthened along with reducing the number of the lenses of the first lens unit L1, the refractive power of each lens of the first lens unit L1 is also strengthened and a radius of curvature is decreased. In this case, amounts of changes (hereinafter, referred to as "sensitivity") of various kinds of aberrations for a manufacturing error of each lens surface or a manufacturing error generated at the time of being embedded into a lens barrel are increased. Therefore, when a desired optical performance needs to be obtained, an extremely high manufacturing accuracy is required. In this case, even if a high imaging performance can be lead at a design phase, the imaging performance is varied at the time of actually manufacturing the optical system and therefore it is difficult to obtain the desired imaging performance. If an image quality that corresponds to a common full high definition (Full HD) having a pixel number of 1920×1080 and a pixel size of a few µm is adopted, some variation of the aberration caused by the manufacturing error can be permitted. However, considering the improvement of the image quality due to the increase of the pixel number or the reduction of the pixel size, it is necessary to reduce the amounts of the changes of the various kinds of aberrations, i.e. reduce the sensitivity, for a certain manufacturing error so as to reduce the variation of the imaging performance at the time of manufacturing the optical system compared to a conventional one.

In each embodiment, in addition to strengthen the refractive power of the first lens unit L1 so as to shorten the total lens length, the following configuration is adopted. The first lens unit L1 is, in order from the object side to the image side, divided into a total of three partial lens units of the first partial lens unit L1A, the second partial lens unit L1B, and the third partial lens unit L1C. The first partial lens unit L1A is configured by two positive lens components. The second partial lens unit L1B is configured by one cemented lens in which at least one positive lens and one negative lens are cemented so as to have a negative combined refractive power, or configured by one positive lens and one negative lens that have a negative combined refractive power. The third partial lens unit L1C that has a positive refractive power as a whole is disposed between the second partial lens unit L1B and the second unit L2.

In the embodiment, the "lens component" means any one of one lens (a single lens) and one cemented lens configured by cementing a plurality of lenses. In the "positive lens component", it has only to have a positive refractive power as a combined refractive power, and therefore it is not limited to the cementation of lenses having refractive powers of the same sign, and it may also be configured by cementing lenses having refractive powers of the different signs. Furthermore, the number of the cementations in one cemented lens is not limited. Also for the second partial lens unit L1B, the number of the cementations in the configuration of one cemented lens is not limited. With regard to each lens (or lens component) from the first partial lens unit L1A to the third partial lens unit L1C, a resin material may also be applied to a surface of the lens by a method of replica or the like so as to perform the aberration correction or the like.

Next, in the optical system of the present embodiment, a mechanism which functions both the aberration correction and the reduction of the sensitivity for the manufacturing error will be described. Since the first partial lens unit L1A is a lens unit which is positioned closest to the object side, a height of the axial paraxial ray is high and the pupil paraxial ray also passes through a peripheral portion of the lens. Therefore, I, II, and III, i.e. the spherical aberration, the coma aberration, and the field curvature of third-order aberration coefficients are much generated. The definitions of the aberration coefficients of I, II, and III are described in for example "MATSUI, OPTICAL TECHNOLOGY SERIES 1, LENS DESIGN METHOD, KYORITSU SHUPPAN CO., LTD.". Therefore, when the first partial lens unit L1A is configured by one lens component, the sensitivity is extremely enlarged. If the first partial lens unit L1A is configured by two positive lens components, the sensitivity can be distributed to each of positive lens components. When the first partial lens unit L1A is configured by one lens component, the refractive power is focused so as to be an extremely strong refractive power. Therefore, the lens is thickened and the achievement of the reduction in weight is difficult. As described above, when the refractive power is shared by the two positive lens components, the increase of the thickness of the lens can be prevented, and as a result the reduction in weight becomes easy compared to the configuration using one lens component.

Since the second partial lens unit L1B is a lens unit that is positioned around a center in the first lens unit L1, the height of the axial paraxial ray is high although not to the extent of the first partial lens unit L1A, and also the pupil paraxial ray passes through the peripheral portion of the lens. Therefore, the various kinds of aberrations that are generated in the first partial lens unit L1A having the positive refractive power is corrected by the second partial lens unit L1B containing the negative lens. In addition, the chromatic aberration generated in a whole of the first lens unit L1 is corrected by the negative lens in the second partial lens unit L1B.

Since the third partial lens unit L1C is a lens unit that is positioned closest to the image side of the first lens unit L1, the pupil paraxial ray passes through near the center of the lens. Therefore, in the third partial lens unit L1C, the coma aberration or the field curvature as much as that of the first partial lens unit L1A is not generated, and instead, mainly the spherical aberration is generated. Therefore, in the third partial lens unit L1C, a remaining spherical aberration that could not be corrected by the second partial lens unit L1B is corrected so as to keep aberration balance. A role of the third partial lens unit L1C as a refractive power arrangement is to adjust the refractive power balance of the first partial lens unit L1A and the second partial lens unit L1B. The balance is adjusted by the refractive power of the third partial lens unit L1C so that the total length can be shortened by an appropriate refractive power as a whole of the first lens unit L1 while correcting the aberrations using the first partial lens unit L1A and the second partial lens unit L1B.

Thus, the first lens unit L1 is configured by the three partial lens units so as to balance the aberration correction in each of the partial lens units and the aberration correction as a whole of the first lens unit L1. Therefore, the refractive power of whole of the first lens unit L1 can be strengthened without significantly increasing the sensitivity in each of the lenses singularly.

Next, a technical meaning of each conditional expression described above will be described. Conditional Expression (1) relates to a focal length of the second partial lens unit L1B. When a value exceeds the upper limit of Conditional Expression (1), the focal length of the second partial lens unit L1B becomes too short. In this case, since the ray emitted from the second partial lens unit L1B is strongly diverged, the reduction in size of the total lens system is difficult and also the correction of the spherical aberration or the coma aberration is difficult, which is not preferable. On the other hand, when the value exceeds the lower limit of Conditional Expression (1), the focal length of the second partial lens unit L1B becomes too long. In this case, since it is difficult to keep the refractive power balance of the first partial lens unit L1A and the third partial lens unit L1C and also to make a cancellation relation of the aberration correction in the first lens unit L1, it is not preferable.

It is preferred that Conditional Expression (1) be set as follows.

$$-2.30 < f_{1B}/f_1 < -0.30 \quad (1a)$$

It is more preferred that Conditional Expression (1a) be set as follows.

$$-1.30 < f_{1B}/f_1 < -0.50 \quad (1b)$$

Conditional Expression (2) relates to a focal length of the third partial lens unit L1C. When a value exceeds the upper limit of Conditional Expression (2), the focal length of the third partial lens unit L1C becomes too long. In this case, the refractive power needed as a whole of the first lens unit L1 has to be mainly obtained by the first partial lens unit L1A, and the refractive power of the first partial lens unit L1A becomes strong. Therefore, it is difficult to correct the spherical aberration or the coma aberration generated in the first partial lens unit L1A, which is not preferable. On the other hand, when the value exceeds the lower limit of Conditional Expression (2), the focal length of the third partial lens unit L1C becomes too short. In this case, since the ray emitted from the third partial lens unit L1C is strongly collected, it is effective for the reduction in size of the total lens system, but the height or the angle of the ray passing through the third partial lens unit L1C is significantly changed in accordance with an object distance when the focusing is performed using the second lens unit L2. In this case, since an amount of the spherical aberration or the coma aberration is significantly changed in accordance with the object distance and it is difficult to correct this change using the second lens unit L2, it is not preferable.

It is preferred that Conditional Expression (2) be set as follows.

$$0.55 < f_{1C}/f_1 < 2.25 \tag{2a}$$

It is more preferred that Conditional Expression (2a) be set as follows.

$$0.60 < f_{1C}/f_1 < 2.00 \tag{2b}$$

Conditional Expression (3) relates to a balance of the focal lengths of first partial lens unit L1A and the third partial lens unit L1C. When a value exceeds the upper limit or the lower limit of Conditional Expression (3), the refractive powers of the first partial lens unit L1A and the third partial lens unit L1C are unbalanced and it is difficult to balance the reduction in size and the high imaging performance, and therefore it is not preferable.

It is preferred that Conditional Expression (3) be set as follows.

$$0.50 < f_{L4}/f_{1C} < 2.25 \tag{3a}$$

It is more preferred that Conditional Expression (3a) be set as follows.

$$0.60 < f_{L4}/f_{1C} < 2.10 \tag{3b}$$

Conditional Expression (4) relates to a combined focal length of the first lens unit L1 and the second lens unit L2 during focusing on infinity.

When a value exceeds the upper limit of Conditional Expression (4), the combined focal length of the first lens unit L1 and the second lens unit L2 is too long. In this case, it is difficult to shorten the total length, and therefore it is not preferable. On the other hand, when the value exceeds the lower limit of Conditional Expression (4), the combined focal length of the first lens unit L1 and the second lens unit L2 is too short. Although this is effective to shorten the total length, the combined refractive power up to the second lens unit L2 is too strong and it is difficult to correct the spherical aberration or the field curvature generated by the second lens unit L2 and in front using a unit at the image side, which is not preferable.

It is preferred that Conditional Expression (4) be set as follows.

$$0.40 < f_{12}/f < 2.25 \tag{4a}$$

It is more preferred that Conditional Expression (4a) be set as follows.

$$0.50 < f_{12}/f < 1.70 \tag{4b}$$

Conditional Expression (5) relates to a unit interval between the first partial lens unit L1A and the second partial lens unit L1B. When the unit interval between the first partial lens unit L1A and the second partial lens unit L1B is set within a range of this conditional expression, the diameter of the second partial lens unit L1B can be decreased and therefore it is preferable to reduce the weight. When a value exceeds the upper limit of Conditional Expression (5), the interval between the first partial lens unit L1A and the second partial lens unit L1B becomes too wide compared to the thickness of the first lens unit L1. In this case, the first lens unit L1 is enlarged and it is difficult to reduce the size and the weight of the first lens unit L1, which is not preferable. On the other hand, when the value exceeds the lower limit of Conditional Expression (5), the interval between the first partial lens unit L1A and the second partial lens unit L1B becomes too narrow compared to the thickness of the first lens unit L1. In this case, the ray emitted from the first partial lens unit L1A enters the second partial lens unit L1B without being sufficiently converged, and therefore the diameter of the lens of the second partial lens unit L1B is enlarged and it is difficult to reduce the weight, which is not preferable.

It is preferred that Conditional Expression (5) be set as follows.

$$0.15 < d_{1AB}/d_1 < 0.70 \tag{5a}$$

It is more preferred that Conditional Expression (5a) be set as follows.

$$0.20 < d_{1AB}/d_1 < 0.60 \tag{5b}$$

Conditional Expression (6) relates to the refractive power, the total length, and the F-number of the first lens unit L1 of the image pickup optical system L0. When a value exceeds the upper limit of Conditional Expression (6), the refractive power of the first lens unit L1 is too weak, the total length of the first lens unit L1 is too long, or the F-number of the first lens unit L1 is too large. When the refractive power of the first lens unit L1 is weakened, it is difficult to shorten the total length. When the total length is long, both the reduction in weight and the reduction in size cannot be achieved. When the F-number is large, the diameter of the lens is decreased and therefore it is advantageous to the reduction in size and the reduction in weight, but there is few use merits since the image is darkened and the imaging performance is deteriorated due to a diffraction limit, which is not preferable. On the other hand, when the value exceeds the lower limit of Conditional Expression (6), the refractive power of the first lens unit L1 is too strong, the total length is too short, or the F-number is too small. It is advantageous for the total length or the F-number since the advantage of the user is increased. However, when the refractive power of the first lens unit L1 is too strong, especially there is no solution capable of correcting the spherical aberration or the coma aberration and therefore it is difficult to maintain the high imaging performance, which is not preferable.

It is preferred that Conditional Expression (6) be set as follows.

$$0.30 < f_1 \times L \times Fno/f^2 < 1.30 \tag{6a}$$

It is more preferred that Conditional Expression (6a) be set as follows.

$$0.40 < f_1 \times L \times Fno/f^2 < 1.27 \tag{6b}$$

Conditional Expression (7) relates to a combined lateral magnification of all the lenses behind (at the image side of) each of lens components in the first partial lens unit L1A and the second partial lens unit L1B. Symbol i denotes a number of the lens component counted in order from the object side (i-th lens component). For example, symbol $\beta_2$ is a combined lateral magnification of all the lenses at the image side relative to the second lens component from the object side (a positive lens component at the image side of the first partial lens unit L1A). Symbol Linum is a sum of the number of the lens components from the first partial lens unit L1A to the second partial lens unit L1B.

A calculation example will be described with reference to Numerical Example 6. The first partial lens unit L1A is configured by three positive lenses, and two lenses at the object side are cemented so as to form one cemented lens and one lens component is configured by this cemented lens. Therefore, symbol $\beta_1$ is a combined lateral magnification from a surface at the object side of the third positive lens from the object side to surfaces (4th to 29th surfaces) at the image side of the lens closest to the image side. Symbol $\beta_2$ is a combined lateral magnification from a surface closest to the object side of the second partial lens unit L1B to surfaces (6th to 29th surfaces) at the image side of the lens closest to the image side. Symbol $\beta_3$ is a combined lateral magnification from a surface closest to the object side of the third partial lens unit L1C to surfaces (9th to 29th surfaces) at the image side of the lens closest to the image side. In Numerical Example 6, the first partial lens unit L1A and the second partial lens unit L1B are configured by a total of three lens components, i.e. the first partial lens unit L1A configured by two lens components and the second partial lens unit L1B configured by one lens component, and accordingly there is no symbol $\beta_4$. Therefore, when applying Conditional Expression (7) to Numerical Example (6), $|\beta_1 \times \beta_2 \times \beta_3| \times L/f$ is obtained.

When a value exceeds the upper limit of Conditional Expression (7), the combined lateral magnification of all the lenses at the rear side (the image side) which is applied to each lens component of the first partial lens unit L1A or the second partial lens unit L1B that has an especially large diameter of the lens of the first partial lens unit L1 is too large. When the combined lateral magnification is large, an amount of change of the aberration caused by the manufacturing error of the lens is magnified by the combined lateral magnification of the rear lenses. In this case, since the magnification error is enlarged in accordance with the combined lateral magnification by the rear lenses even when it is a small magnification error, an image obtained as a result is extremely changed from the imaging performance of a design value. In such a situation, the accuracy required for manufacturing the lens or the accuracy required for the assembly becomes high, which is not preferable. On the other hand, when the value exceeds the lower limit of Conditional Expression (7), the combined lateral magnification is too small. In this case, the ability of the aberration correction that the lens has becomes small and therefore a load of the other lenses that share the aberration correction becomes large, which is not preferable.

It is preferred that Conditional Expression (7) be set as follows.

$$0.75 < \left| \prod_{i=1}^{L1num} \beta_i \right| \times \frac{L}{f} < 8.00 \qquad (7a)$$

It is more preferred that Conditional Expression (7a) be set as follows.

$$1.00 < \left| \prod_{i=1}^{L1num} \beta_i \right| \times \frac{L}{f} < 7.00 \qquad (7b)$$

The optical system of the present embodiment is configured as described above, and more preferably, it is configured so as to meet at least one of the conditions described below. According to this, while a high imaging performance is maintained, effects of further shortening the total lens length and reducing the sensitivity can be easily obtained.

It is preferred that at least a positive lens component at the image side of the two positive lens components in the first partial lens unit L1A have a convex meniscus shape at the object side. According to such a configuration, the ray converged by the positive lens component closest to the object side can enter the positive lens component at the image side at a gentle incident angle, i.e. at an angle closer to an angle of a surface normal. In addition, the ray passing through the surface at the object side of the positive lens component at the image side can enter the surface at the image side at a gentle incident angle, i.e. at an angle closer to an angle of a surface normal. According to such a configuration, since the generation of the spherical aberration or the coma aberration can be reduced, it is preferable. If the meniscus shape is adopted, the refractive power can also be maintained to some extent. Therefore, since sharing the refractive power in the first partial lens unit L1A can also be possible and the sensitivity can be decreased, it is preferable.

In addition, it is preferred that the first lens unit L1 be provided with a diffractive optical element DOE that has at least one diffractive optical portion D. Providing the diffractive optical element DOE, it is easy to correct the color aberration without increasing the number of the lenses, and the color aberration can be corrected without using an abnormal dispersion glass such as fluorite that has a comparatively heavy specific gravity. In this case, further reduction in weight can be achieved, and therefore it is preferable.

It is preferred that the third partial lens unit L1C be configured by one positive lens component. According to such a configuration, since the refractive power and the aberration in the first lens unit L1 can be balanced with a minimum number of the lenses, it is preferable to the reduction in weight.

It is preferred that the second partial lens unit L1B be configured by one cemented lens. Configuring the second partial lens unit L1B using the cemented lens, the interface of air between the positive lens and the negative lens is removed and therefore a refractive index difference between the lenses for the traveling ray can be decreased. According to such a configuration, the sensitivity can be reduced compared to a configuration of using only a single lens, which is preferable.

It is preferred that the first partial lens unit L1A be configured by two positive lenses. Arranging the two positive lenses so as to share the refractive power, the sensitivity can also be shared and therefore the sensitivity can be reduced compared to a case where the configuration of having one positive lens is adopted. Therefore, manufacturing the optical system can be further easy. Adopting the configuration where a negative lens is not used in the first partial lens unit L1A, a converged light beam can be efficiently made and therefore the shortening of the total length can be easy. In addition, the reduction in weight can also be achieved, which is more preferable.

A focal length of the first lens unit L1 is referred to as $f_1$, a focal length of the first partial lens unit L1A is referred to as $f_{1A}$. In the lens component having a meniscus shape in the first partial lens unit L1A, a radius of curvature of a surface closest to the object side which contacts the air is referred to as $ML_{R1}$, and a radius of curvature of a surface closest to the image side which contacts the air is referred as $ML_{R2}$. A distance on the optical axis from an apex of the surface at the object side of the lens closest to the object side of the first lens unit L1 to an apex of the surface of the image side of the lens closest to the image side of the first lens unit L1 is referred to as $d_1$. A distance on the optical axis from an apex of surface at the object side of the lens closest to the object side of the first partial lens unit L1A to an apex of the surface at the image side of the lens closest to the image side of the first partial lens unit L1A is referred to as $d_{1A}$. A focal length of the total system during focusing on infinity is referred to as f, and a focal length of the second lens unit L2 is referred to as $f_2$. A focal length of the positive lens component at the object side of the two positive lens components in the first partial lens unit L1A is referred to as $f_{1G}$, and a focal length of the positive lens at the image side is referred to as $f_{G2}$. A focal length only by a diffraction component of the diffractive optical element DOE is referred to as $f_{DOE}$. In this case, it is preferred that the following Conditional Expressions (8) to (13) are met.

$$0.60 < f_{L4}/f_1 < 2.00 \quad (8)$$

$$0.20 < (ML_{R2} - ML_{R1})/(ML_{R2} + ML_{R1}) < 0.95 \quad (9)$$

$$0.08 < d_{L4}/d_1 < 0.60 \quad (10)$$

$$-0.500 < f_2/f < -0.050 \quad (11)$$

$$0.50 < f_{G1}/f_{GE} < 3.00 \quad (12)$$

$$5.0 < f_{DOE}/f < 200.0 \quad (13)$$

Conditional Expression (8) relates to a focal length of the first partial lens unit L1A. When a value exceeds the upper limit of Conditional Expression (8), the focal length of the first partial lens unit L1A becomes too long. In this case, the ray emitted from the first partial lens unit L1A enters the second partial lens unit L1B without being sufficiently converged. Therefore, the diameter of the lens of the second partial lens unit L1B is increased and there it is difficult to reduce the weight, which is not preferable. On the other hand, when the value exceeds the lower limit of Conditional Expression (8), the focal length of the first partial lens unit L1A becomes too short. In this case, since the ray emitted from the first partial lens unit L1A is strongly collected, it is effective for the reduction in size of the total lens system but it is difficult to correct the spherical aberration or the coma aberration, which is not preferable.

It is preferred that Conditional Expression (8) be set as follows.

$$0.65 < f_{L4}/f_1 < 1.70 \quad (8a)$$

It is more preferred that Conditional Expression (8a) be set as follows.

$$0.67 < f_{L4}/f_1 < 1.40 \quad (8b)$$

Conditional Expression (9) relates to a shape of the meniscus lens having a convex shape at the object side in the first partial lens unit L1A. When a value exceeds the upper limit of Conditional Expression (9), a difference of radii of curvature between the surfaces at the object side and the image side becomes too large. In this case, the ray passing through the surface at the object side cannot enter the surface at the image side at a gentle angle, and therefore an amount of the generation of the spherical aberration or the coma aberration is increased. When these aberrations is tried to be corrected in the first partial lens unit L1A, it is necessary to generate aberrations having the same amount and the opposite sign for cancellation and it causes the increase of the sensitivity, which is not preferable. When the correction is performed by units at the image side relative to the first partial lens unit L1A, the units has a height of the axial paraxial ray that is lower than that of the first partial lens unit L1A. Therefore, it is difficult to correct the spherical aberration and the coma aberration generated in the first partial lens unit L1A without influencing on other aberrations, which is not preferable. On the other hand, when the value exceeds the lower limit of Conditional Expression (9), the difference of the radii of curvature between the surfaces at the object side and the image side becomes too small. In this case, in order to obtain the refractive power needed for the first partial lens unit L1A, it is necessary to strengthen the refractive power of the other positive lens component, and the share of the refractive power is unbalanced. Therefore, the sensitivity of the positive lens component of having the stronger refractive power is increased, which is not preferable.

It is preferred that Conditional Expression (9) be set as follows.

$$0.25 < (ML_{R2} - ML_{R1})/(ML_{R2} + ML_{R1}) < 0.95 \quad (9a)$$

It is more preferred that Conditional Expression (9a) be set as follows.

$$0.35 < (ML_{R2} - ML_{R1})/(ML_{R2} + ML_{R1}) < 0.93 \quad (9b)$$

Conditional Expression (10) relates to a thickness of the first partial lens unit L1A. When the thickness of the first partial lens unit L1A is set within a range of this conditional expression, the thickness of the first partial lens unit L1A is thinner than the thickness of the first lens unit L1. In this case, since the positive lens components can be closely disposed each other, a difference of the heights of the axial paraxial rays for the positive lens components is decreased. According to such a configuration, sharing the correction of the spherical aberration or the coma aberration in the first partial lens unit L1A is easy, which is preferable.

When a value exceeds the upper limit of Conditional Expression (10), the thickness of the first partial lens unit L1A is thicker than the thickness of the first lens unit L1. In this case, the height of the axial paraxial ray is significantly changed in the first partial lens unit L1A, and it is difficult to share the correction of the spherical aberration or the coma aberration, which is not preferable. On the other hand, when the value exceeds the lower limit of Conditional Expression (10), the thickness of the first partial lens unit L1A is too thin compared to the thickness of the first lens unit L1. In this case, since the refractive power of the lens in the first partial lens unit L1A is too small, the total length of the lens becomes long and therefore the reduction in size is difficult, which is not preferable.

It is preferred that Conditional Expression (10) be set as follows.

$$0.09 < d_{L4}/d_1 < 0.50 \quad (10a)$$

It is more preferred that Conditional Expression (10a) be set as follows.

$$0.10 < d_{L4}/d_1 < 0.40 \quad (10b)$$

Conditional Expression (11) relates to a focal length of the second lens unit L2. When a value exceeds the upper limit of Conditional Expression (11), the focal length of the second lens unit L2 becomes too short. In this case, since a moving amount of the second lens unit L2 during the focusing operation becomes small, it is effective for the reduction in size of the lens. However, since the refractive power of the second lens unit L2 becomes strong, the amount of the spherical aberration or the coma aberration is significantly changed in accordance with the object distance, and it is not preferable because it is difficult to correct this change using the second lens unit L2 or other lens units. On the other hand, when the value exceeds the lower limit of Conditional Expression (11), the focal length of the second lens unit L2 becomes too long. In this case, since the moving amount of the second lens unit L2 is large during the focusing operation, a wide space is necessary. In this configuration, since the reduction in size of the lens is difficult, it is not preferable.

It is preferred that Conditional Expression (11) be set as follows.

$$-0.400 < f_2/f < -0.075 \quad (11a)$$

It is more preferred that Conditional Expression (11a) be set as follows.

$$-0.350 < f_2/f < -0.100 \quad (11b)$$

Conditional Expression (12) relates to a focal length balance of each positive lens component in the first partial lens unit L1A. When a value exceeds the upper limit or the lower limit of Conditional Expression (12), the refractive power in the first partial lens unit L1A is unbalanced, and also the sharing of the aberration correction is unbalanced. In this case, since the sensitivity in one positive lens component is also increased and a high manufacturing accuracy is required, it is not preferable.

It is preferred that Conditional Expression (12) be set as follows.

$$0.50 < f_{G1}/f_{G2} < 2.75 \quad (12a)$$

It is more preferred that Conditional Expression (12a) be set as follows.

$$0.55 < f_{G1}/f_{G2} < 2.50 \quad (12b)$$

Conditional Expression (13) relates to a focal length of only the diffractive optical portion D in the first lens unit L1. When a value exceeds the upper limit or the lower limit of Conditional Expression (13), the correction balance between the axial chromatic aberration and the chromatic aberration of magnification in the first lens unit L1 is not easily obtained. Therefore, the correction is insufficient for one of the axial chromatic aberration and the chromatic aberration of magnification, and on the other hand, the correction is in excess for the other one. In this case, a high optical performance cannot be maintained, and therefore it is not preferable.

It is preferred that Conditional Expression (13) be set as follows.

$$7.5 < f_{DOE}/f < 150.0 \quad (13a)$$

It is more preferred that Conditional Expression (13a) be set as follows.

$$10.0 < f_{DOE}/f < 100.0 \quad (13b)$$

As described above, according to the optical system (the telephoto lens) of the present embodiment, small-sized and lightweight optical system and image pickup apparatus that are easily manufactured can be provided.

Next, configurations of Embodiments 1 to 10 will be described in detail. In each embodiment, at least one lens surface of the first lens unit L1 has an aspherical surface shape. An aperture stop SP is disposed at the image side relative to the first lens unit L1. The third lens L3 is, in order from the object side to the image side, configured by a fixed first partial lens unit L31, a second partial lens unit L32, and a fixed third partial lens unit L33. The second partial lens unit L32 moves in a direction orthogonal to an optical axis OA (an arrow LT) so as to perform a correction of an image blur. The focusing operation from an infinity object to a short distance object is performed by moving the second lens L2 to the image plane side on the optical axis.

Embodiment 1

First of all, referring to FIG. 1A, the image pickup optical system L0 (the optical system) in Embodiment 1 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A is a single lens that has a positive refractive power, and in order from the object side to the image side, they are configured by a biconvex lens and a meniscus lens having a convex shape at the object side. The second partial lens unit L1B includes one cemented lens, and this cemented lens is, in order from the object side to the image side, configured by cementation of a meniscus lens having a negative refractive power and having a convex shape at the object side and a meniscus lens having a positive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by one biconvex lens.

Each of the lens surfaces at the object side of the positive lens closest to the object side of the first partial lens unit L1A and the biconvex lens of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and is, in order from the object side to the image side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one convex lens. The cemented lens at the image side is a cemented lens which is configured by one biconvex lens and one biconcave lens.

Embodiment 2

Figure 2A:
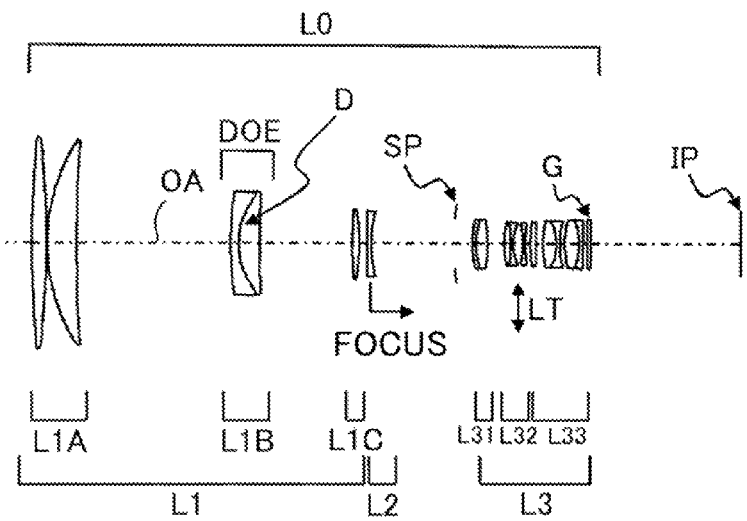
FIGS. 2A and 2B are a cross-sectional diagram and an aberration diagram of an optical system in a state where an object distance is at infinity in Embodiment 2, respectively.
Figure 2B:
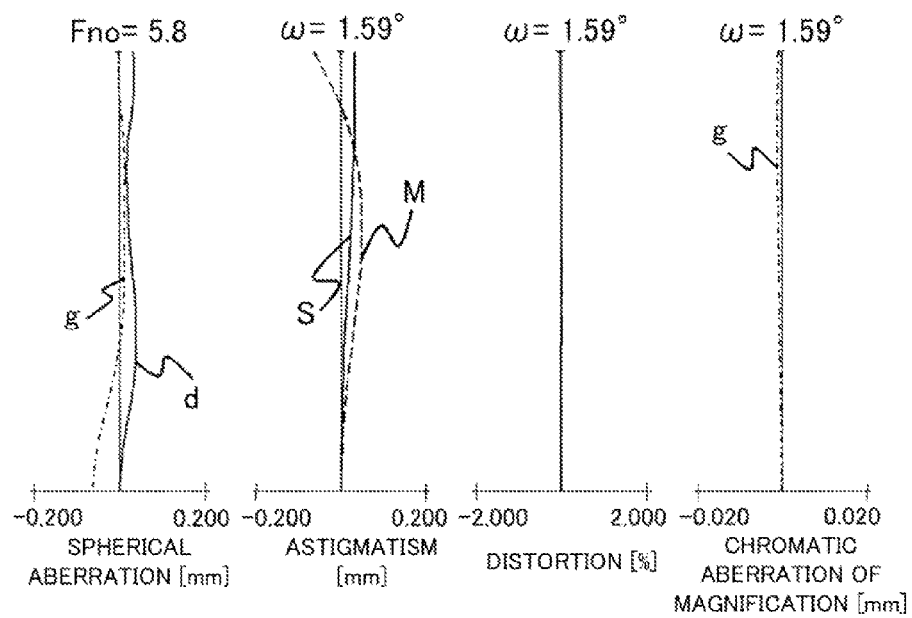

Next, referring to FIG. 2A, the image pickup optical system L0 (the optical system) in Embodiment 2 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A has a single lens having a positive refractive power, and the two positive lens is, in order from the object side to the image side, configured by a biconvex lens and a meniscus lens having a biconvex shape at the object side. The second partial lens unit L1B is configured by one cemented lens, and this cemented lens is, in order from the object side to the image side, configured by cementation of a meniscus lens having a negative refractive power and having a convex shape at the object side and a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by one biconvex lens.

Each of the lens surfaces at the object side of the positive lens closest to the object side of the first partial lens unit L1A and the biconvex lens of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and is, in order from the object side to the image side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one meniscus lens having a positive refractive power and having a convex shape at the object side and two cemented lenses. Each of the two cemented lenses is a cemented lens which has one biconvex lens and one biconcave lens.

Embodiment 3

Figure 3A:
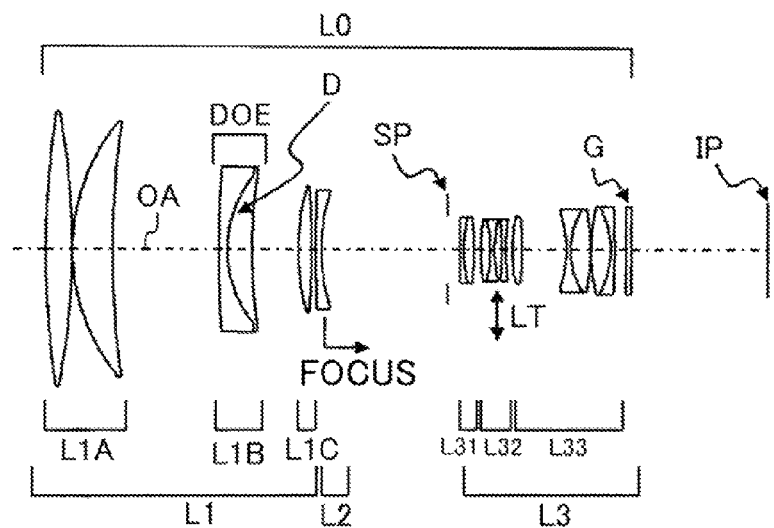
FIGS. 3A and 3B are a cross-sectional diagram and an aberration diagram of an optical system in a state where an object distance is at infinity in Embodiment 3, respectively.
Figure 3B:
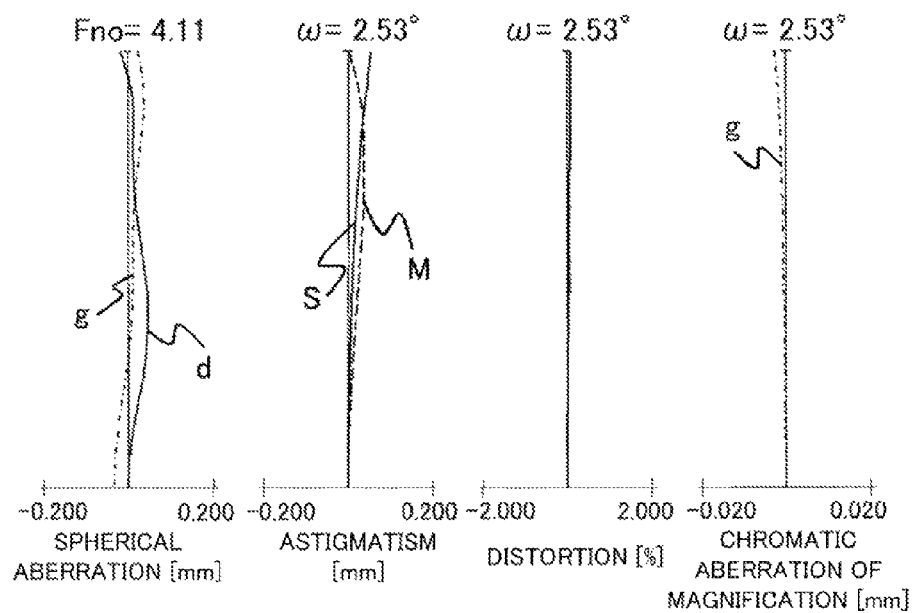

Next, referring to FIG. 3A, the image pickup optical system L0 (the optical system) in Embodiment 3 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A has a single lens having a positive refractive power, and the two positive lens is, in order from the object side to the image side, configured by a biconvex lens and a meniscus lens having a biconvex shape at the object side. The second partial lens unit L1B is configured by one cemented lens. This cemented lens is, in order from the object side to the image side, configured by cementation of a meniscus lens having a negative refractive power and having a convex shape at the object side and a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by one biconvex lens.

Each of the lens surfaces at the object side of the positive lens closest to the object side of the first partial lens unit L1A and the meniscus lens having a negative refractive power and having a convex shape at the object side of the second partial lens unit L1B has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and is, in order from the object side to the image side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one meniscus lens having a negative refractive power and having a convex shape at the image side.

Embodiment 4

Figure 4A:
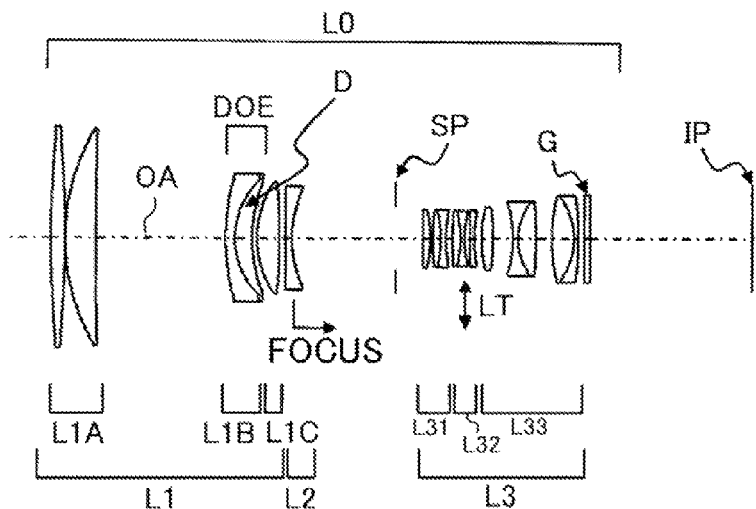
FIGS. 4A and 4B are a cross-sectional diagram and an aberration diagram of an optical system in a state where an object distance is at infinity in Embodiment 4, respectively.
Figure 4B:
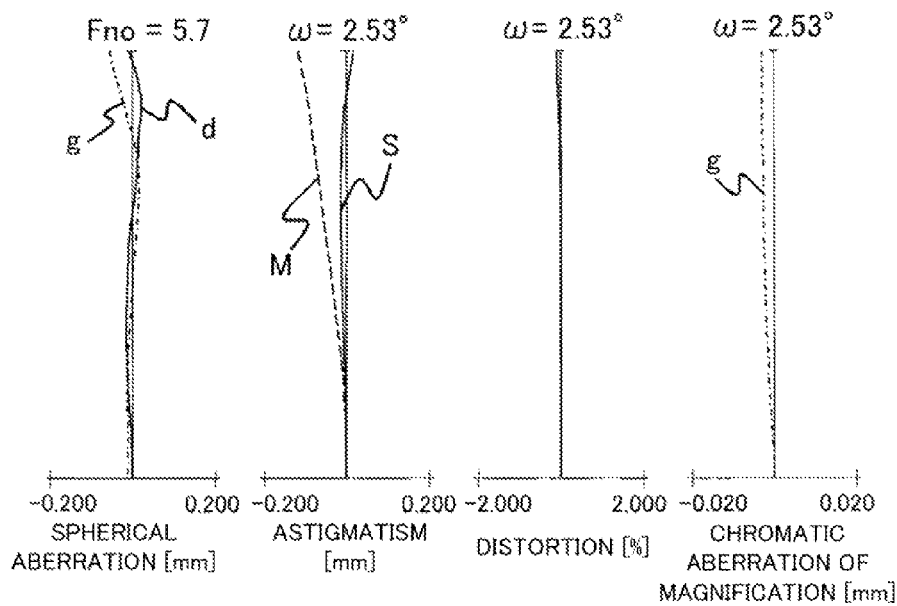

Next, referring to FIG. 4A, the image pickup optical system L0 (the optical system) in Embodiment 4 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A has a single lens having a positive refractive power, and the two positive lens is, in order from the object side to the image side, configured by a biconvex lens and a meniscus lens having a biconvex shape at the object side. The second partial lens unit L1B is configured by one cemented lens. This cemented lens is, in order from the object side to the image side, configured by cementation of a meniscus lens having a negative refractive power and having a convex shape at the object side and a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by one biconvex lens.

The lens surface at the object side of the positive lens closest to the object side of the first partial lens unit L1A has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one biconvex lens and one cemented lens. This cemented lens is, in order from the object side to the image side, configured by cementation of a biconvex lens and a biconcave lens. The second partial lens unit L32 is configured by one cemented lens that is configured by cementing a biconvex lens and a biconcave lens, and one biconvex lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one meniscus lens having a negative refractive power and having a convex shape at the image side.

Embodiment 5

Figure 5A:
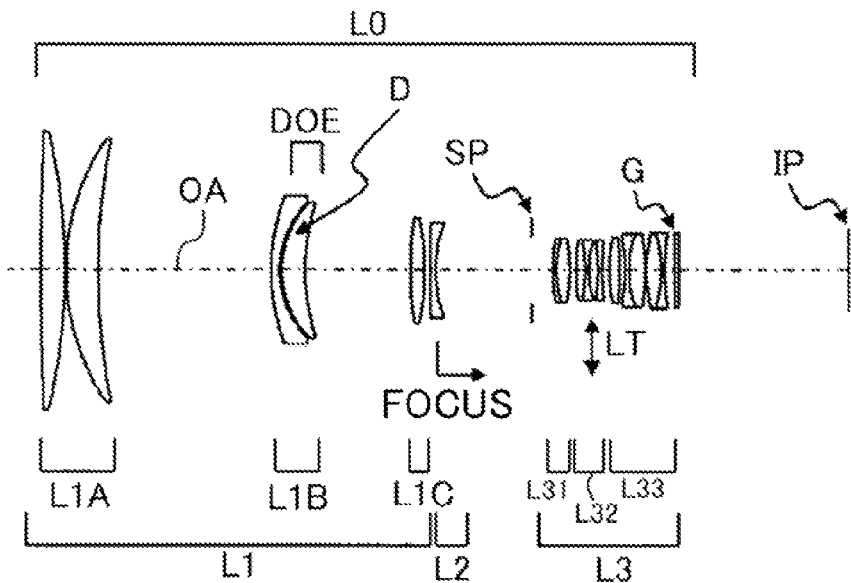
FIGS. 5A and 5B are a cross-sectional diagram and an aberration diagram of an optical system in a state where an object distance is at infinity in Embodiment 5, respectively.
Figure 5B:
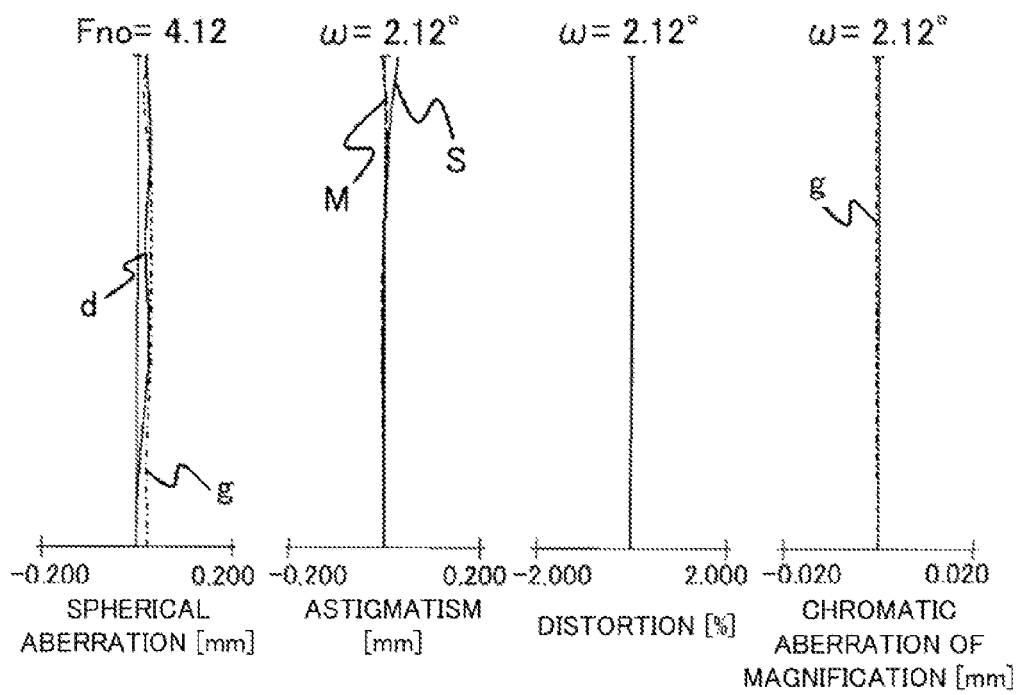

Next, referring to FIG. 5A, the image pickup optical system L0 (the optical system) in Embodiment 5 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A has a single lens having a positive refractive power, and the two positive lens is, in order from the object side to the image side, configured by a biconvex lens and a meniscus lens having a biconvex shape at the object side. The second partial lens unit L1B is, in order from the object side to the image side, configured by one negative lens and one positive lens. The negative lens is a meniscus lens having a negative refractive power and having a convex shape at the object side, and the positive lens is a meniscus lens having a positive refractive power and having a convex shape at the object side. The positive lens constitutes the diffractive optical element DOE. The diffractive optical portion D constituting the diffractive optical element DOE is disposed on a surface at the object side of the positive lens component. The third partial lens unit L1C is configured by one biconvex lens.

Each of the lens surfaces at the object side of the positive lens closest to the object side of the first partial lens unit L1A and the biconvex lens of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and the cemented lens is, in order from the object side to the image side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one biconcave lens.

Embodiment 6

Figure 6A:
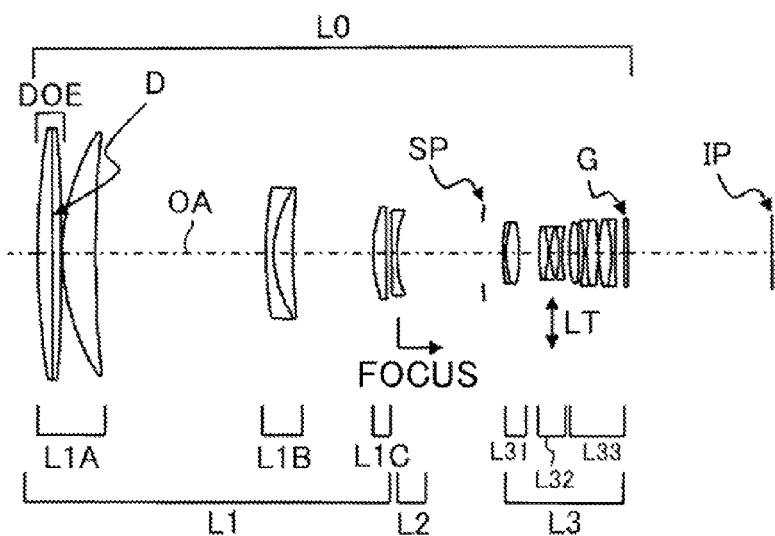
FIGS. 6A and 6B are a cross-sectional diagram and an aberration diagram of an optical system in a state where an object distance is at infinity in Embodiment 6, respectively.
Figure 6B:
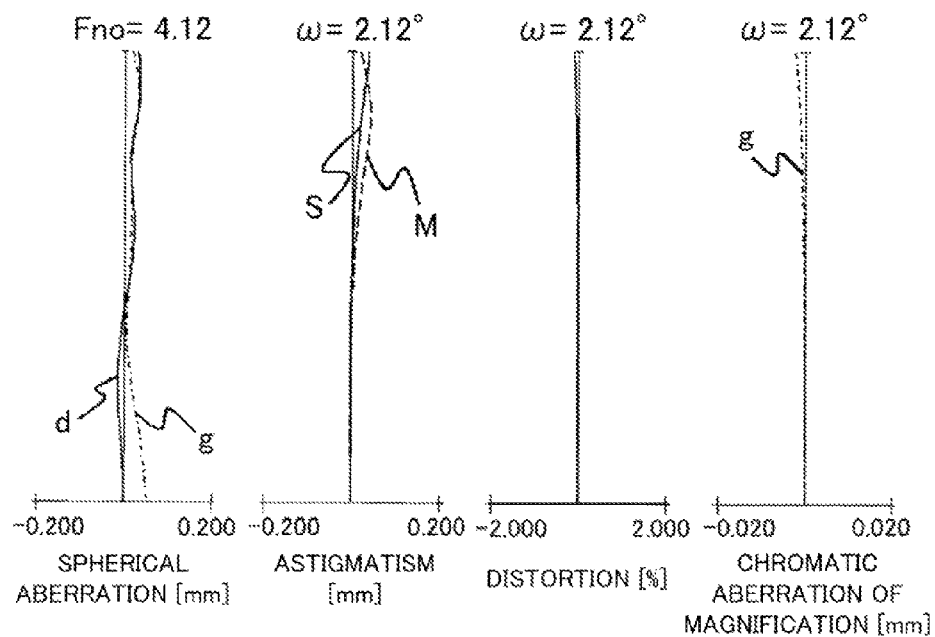

Next, referring to FIG. 6A, the image pickup optical system L0 (the optical system) in Embodiment 6 of the present invention will be described. The first lens unit L1 is, in order from the object side to the image side, configured by the first partial lens unit L1A, the second partial lens unit L1B, and the third partial lens unit L1C. The positive lens component at the object side of the two positive lens components in the first partial lens unit L1A is configured by a cemented lens which is obtained by cementing two positive lenses. The positive lens component at the image side is configured by a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. This cemented lens is, in order from the object side, configured by cementing a meniscus lens having a negative refractive power and having a convex shape at the object side and a meniscus lens having a positive refractive power and having a convex shape at the object side. The third partial lens unit L1C is configured by one meniscus lens having a convex shape at the object side.

Each of the lens surfaces at the object side of the positive lens closest to the object side of the first partial lens unit L1A and the meniscus lens of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and the cemented lens is, in order from the object side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one biconcave lens.

Embodiment 7

Figure 7A:
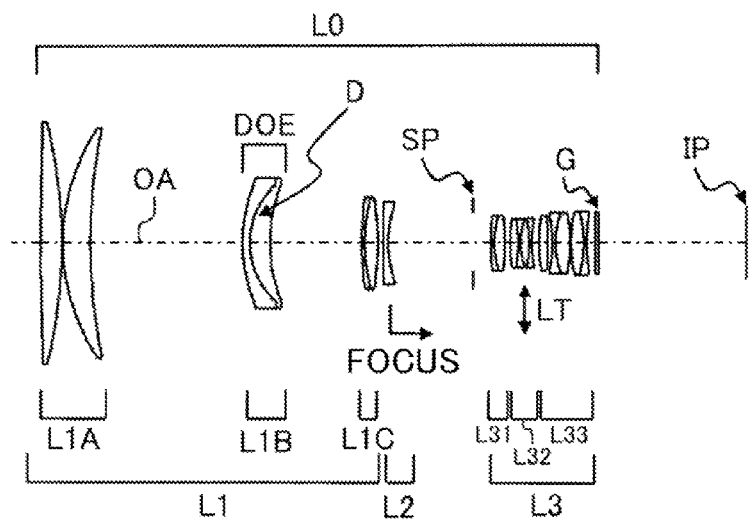
FIGS. 7A and 7B are a cross-sectional diagram and an aberration diagram of an optical system in a state where an object distance is at infinity in Embodiment 7, respectively.
Figure 7B:
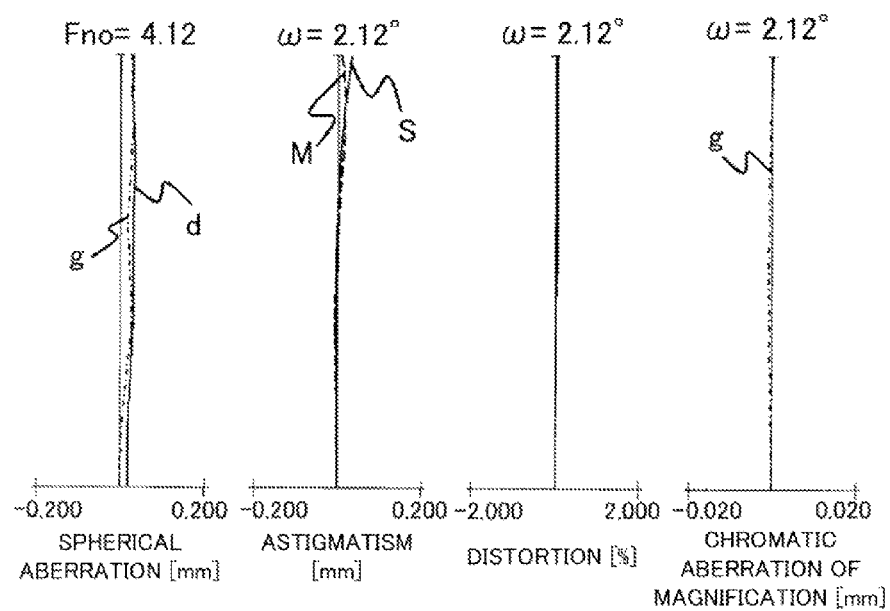

Next, referring to FIG. 7A, the image pickup optical system L0 (the optical system) in Embodiment 7 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A is configured by a single lens having a positive refractive power, and is, in order from the object side to the image side, configured by a biconvex lens and a meniscus lens having a convex shape at the object side. The second partial lens unit L1B is configured by one cemented lens. This cemented lens is, in order from the object side to the image side, configured by cementation of a meniscus lens having a negative refractive power and having a convex shape at the object side and a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by one cemented lens which is configured by a meniscus lens having a negative refractive power and a convex shape at the object side and a biconvex lens.

Each of the lens surface at the object side of the positive lens closest to the object side of the first partial lens unit L1A and the lens surface contacting the air closest to the object side of the meniscus lens having a negative refractive power of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and the cemented lens is, in order from the object side to the image side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one biconcave lens.

Embodiment 8

Figure 8A:
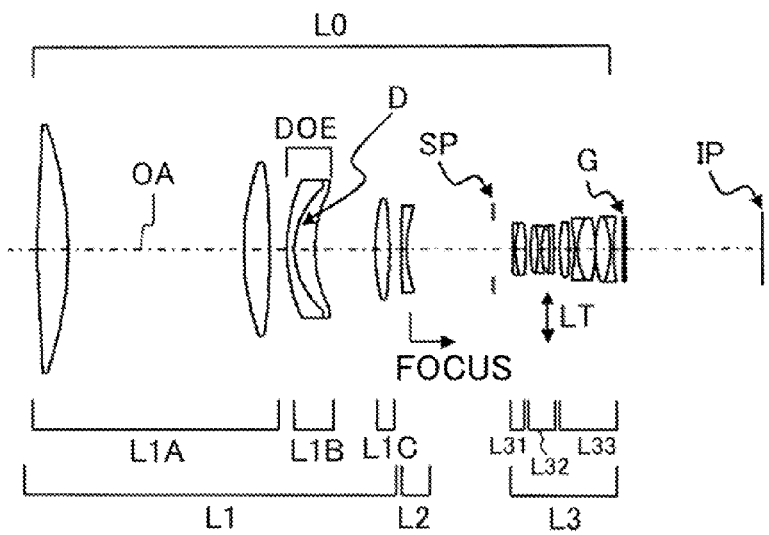
FIGS. 8A and 8B are a cross-sectional diagram and an aberration diagram of an optical system in a state where an object distance is at infinity in Embodiment 8, respectively.
Figure 8B:
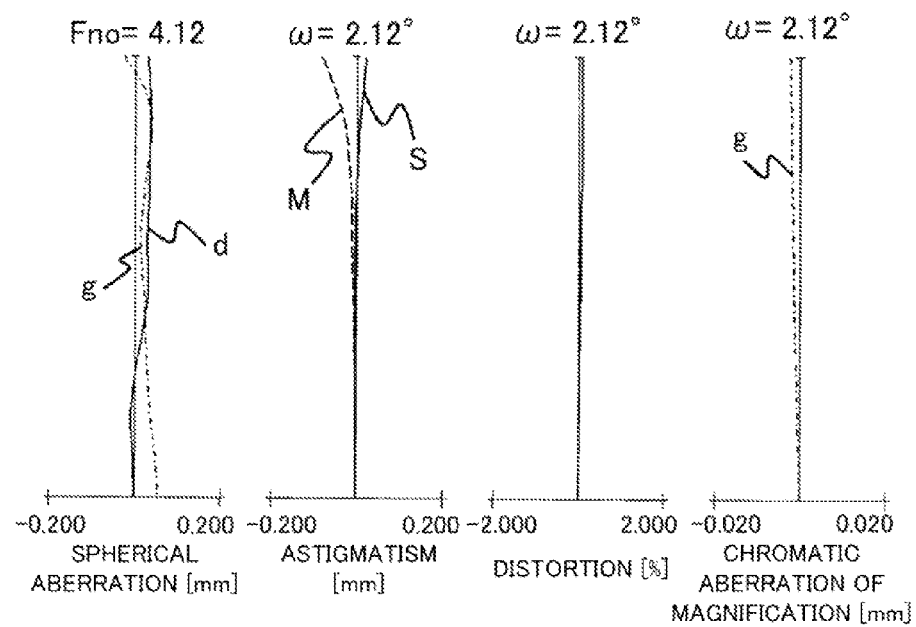

Next, referring to FIG. 8A, the image pickup optical system L0 (the optical system) in Embodiment 8 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A is configured by a biconvex single lens having a positive refractive power. In the present embodiment, an interval between the two lenses (lens components) of the first partial lens unit L1A is widened so as to decrease the diameter of the lens at the image side, as well as the sharing of the sensitivity in the first partial lens unit L1A. The second partial lens unit L1B is configured by one cemented lens. This cemented lens is, in order from the object side to the image side, configured by cementation of a meniscus lens having a negative refractive power and having a convex shape at the object side and a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by one biconvex lens.

Each of the lens surfaces at the object side of the positive lens closest to the object side of the first partial lens unit L1A and the biconvex lens of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and the cemented lens is, in order from the object side to the image side, configured by a meniscus lens having a negative refractive power and having a convex shape at the object side and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one biconcave lens.

Embodiment 9

Next, referring to FIG. 9A, the image pickup optical system L0 (the optical system) in Embodiment 9 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A is configured by a single lens having a positive refractive power, and it is, in order from the object side to the image side, configured by a biconvex lens and a meniscus lens having a convex shape at the object side. The second partial lens unit L1B is configured by one cemented lens. This cemented lens is, in order from the object side to the image side, configured by cementation of a meniscus lens having a negative refractive power and having a convex shape at the object side and a meniscus lens having a positive refractive power and having a convex shape at the object side. The third partial lens unit L1C is configured by one biconvex lens.

The lens surface at the object side of the positive lens closest to the object side of the first partial lens unit L1A has an aspherical surface. The second lens unit L2 is configured by a biconcave lens having a negative refractive power. The aperture stop SP is disposed between the second lens unit L2 and the third lens unit L3 as an aperture stop whose opening diameter is variable. In the third lens unit L3, the first partial lens unit L31 is configured by one biconvex lens and one cemented lens. This cemented lens is, in order from the object side to the image side, configured by cementation of a biconvex lens and a biconcave lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one meniscus lens having a negative refractive power and having a convex shape at the image side.

Embodiment 10

Next, referring to FIG. 10A, the image pickup optical system L0 (the optical system) in Embodiment 10 of the present invention will be described. The first lens unit L1 is, in order from the object side to the image side, configured by the first partial lens unit L1A, the second partial lens unit L1B, and the third partial lens unit L1C. Each of the two positive lens components in the first partial lens unit L1A is configured by a single lens having a positive refractive power, and it is, in order from the object side to the image side, configured by a biconvex lens and a meniscus lens having a convex shape at the object side. The second partial lens unit L1B is configured by one cemented lens. This cemented lens is, in order from the object side to the image side, configured by cementation of a meniscus lens having a negative refractive power and having a convex shape at the object side and a meniscus lens having a positive refractive power and having a convex shape at the object side. This cemented lens constitutes the diffractive optical element DOE. The diffractive optical portion D constituting the diffractive optical element DOE is disposed on a cemented surface of the cemented lens. The third partial lens unit L1C is configured by two biconvex lenses.

Each of the lens surface at the object side of the positive lens closest to the object side of the first partial lens unit L1A and the lens surface at the object side of the biconvex lens at the image side of the biconvex lenses of the third partial lens unit L1C has an aspherical surface. The second lens unit L2 is configured by a meniscus lens having a negative refractive power and having a convex shape at the object side. The aperture stop SP is disposed between the second lens unit L2 and the third lens unit L3 as an aperture stop whose opening diameter is variable. In the third lens unit L3, the first partial lens unit L31 is configured by one cemented lens, and it is, in order from the object side to the image side, configured by a meniscus lens having a negative refractive power and having a convex shape at the object side, and a biconvex lens. The second partial lens unit L32 is configured by one cemented lens configured by cementing a biconvex lens and a biconcave lens, and one biconcave lens. The third partial lens unit L33 is configured by one biconvex lens and two cemented lenses. The cemented lens at the object side is a cemented lens which is configured by one biconcave lens and one biconvex lens. The cemented lens at the image side is a cemented lens which is configured by one biconvex lens and one biconcave lens.

In Embodiments 1 to 8, and 10, the diffractive optical portion D is provided on an optical surface, but its base may have any of a spherical shape, a plane, and an aspherical shape. The diffractive optical portion D may also be made by a so-called replica that is a method of applying a film such as a plastic to the optical surface as the diffractive optical portion (a diffractive surface). With regard to the shape of the diffraction grating, when a phase coefficient of the 2i-th order term is referred to as $C_{2i}$, a phase $\phi(H)$ at a distance H from the optical axis OA is represented by the following Expression (14). In Expression (14), symbol m is a diffraction order, and symbol $\lambda_0$ is a reference wavelength.

$$\varphi(H) = \left(2\prod \frac{m}{\lambda_0}\right) \cdot (C_2 \cdot H^2 + C_4 \cdot H^4 + C_6 \cdot H^6 + \ldots + C_{2i} \cdot H^{2i}) \quad (14)$$

Hereinafter, Numerical examples 1 to 10 that correspond to Embodiments 1 to 10, respectively, are indicated. In each numerical examples, symbol i denotes an order of a surface counted from the object side, symbol $r_i$ denotes a radius of curvature of the i-th surface counted from the object side, symbol $d_i$ denotes an interval between the i-th surface and the (i+1)-th surface, and symbols $nd_i$ and $vd_i$ denote a refractive index and Abbe's number of the i-th optical member, respectively. Symbols f, Fno, and 2ω denote a focal length of the total system during focusing on an infinite object, an F-number, and an angle of field (degree), respectively. In each numerical example, the two surfaces closest to the image side is a glass block G such as a filter. The diffractive optical element (the diffractive surface) is represented by providing a phase coefficient of a phase function of Expression (14). An aspherical surface shape is represented as the following Expression (15), where X axis denotes a position in the optical axis direction, H axis denotes a position in a direction perpendicular to the optical axis, a travel direction of light is positive, symbol R denotes a paraxial radius of curvature, symbol k denotes an eccentricity, and each of symbols A4, A6, A8, and A10 denotes an aspherical coefficient.

$$X = \frac{\left(\frac{H^2}{R}\right)}{\left\{1 + \sqrt{1 - (1+k)\cdot\left(\frac{H}{R}\right)^2}\right\}} + \quad (15)$$

$$A4\cdot H^4 + A6\cdot H^6 + A8\cdot H^8 + A10\cdot H^{10}$$

In each of the following numerical examples, for example, the description of "e-Z" means "$10^{-Z}$". Additionally, the relationships between each conditional expression described above and various numerical values in the numerical examples are indicated in Table 1.

Numerical Example 1 f = 584.99 mm Fno = 4.12 2ω = 4.24

Surface data

| Surface number | r | d | nd | vd | Effective diameter |
|---|---|---|---|---|---|
| 1 (aspherical) | 1425.908 | 12.50 | 1.48749 | 70.2 | 141.99 |
| 2 | −311.309 | 0.50 | | | 141.95 |
| 3 | 124.218 | 16.27 | 1.43387 | 95.1 | 134.78 |
| 4 | 339.103 | 91.63 | | | 133.15 |
| 5 | 102.812 | 4.20 | 1.88300 | 40.8 | 76.77 |
| 6 (diffractive) | 47.706 | 12.03 | 1.49700 | 81.5 | 68.78 |
| 7 | 102.344 | 55.55 | | | 67.50 |
| 8 (aspherical) | 203.592 | 7.00 | 1.48749 | 70.2 | 53.35 |
| 9 | −152.884 | 3.00 | | | 52.54 |
| 10 | 1256.465 | 3.00 | 1.57099 | 50.8 | 49.09 |
| 11 | 73.366 | 50.00 | | | 46.46 |
| 12 (stop) | ∞ | 11.00 | | | 34.64 |
| 13 | 131.621 | 2.00 | 1.83481 | 42.7 | 31.59 |
| 14 | 60.828 | 6.44 | 1.48749 | 70.2 | 30.83 |
| 15 | −131.730 | 3.00 | | | 30.16 |
| 16 | 101.237 | 4.45 | 1.75520 | 27.5 | 29.66 |
| 17 | −92.416 | 1.70 | 1.69680 | 55.5 | 29.33 |
| 18 | 44.393 | 4.95 | | | 28.47 |
| 19 | −108.847 | 2.00 | 1.69680 | 55.5 | 28.79 |
| 20 | 100.753 | 4.00 | | | 29.70 |
| 21 | 94.758 | 5.16 | 1.61340 | 44.3 | 32.37 |
| 22 | −203.567 | 3.00 | | | 33.08 |
| 23 | −86.220 | 2.00 | 1.59282 | 68.6 | 33.63 |
| 24 | 59.455 | 8.64 | 1.61340 | 44.3 | 35.67 |
| 25 | −90.999 | 0.30 | | | 36.90 |
| 26 | 69.415 | 7.65 | 1.74950 | 35.3 | 38.07 |
| 27 | −85.492 | 2.00 | 1.80809 | 22.8 | 37.75 |
| 28 | 132.912 | 5.00 | | | 37.26 |
| 29 | ∞ | 2.00 | 1.51633 | 64.1 | 37.49 |
| 30 | ∞ | | | | 37.58 | f = 584.99 mm Fno = 4.12 2ω = 4.24

Aspherical surface data

First surface

K = 0.00000e+000  A4 = −2.22863e−008  A6 = −1.16043e−013
A8 = 1.86005e−017  A10 = −1.33160e−021

Eighth surface

K = 7.17684e−001  A4 = 1.54167e−007  A6 = 5.45588e−011
A8 = 8.37024e−015  A10 = 3.83835e−018

Sixth surface (diffractive surface)

C2 = −3.97172e−005  C4 = −1.98571e−009  C6 = −7.88332e−014
C8 = −9.18191e−015  C10 = 1.97271e−017  C12 = −1.61384e−020
C14 = 2.61850e−024  C16 = 3.99737e−027  C18 = −2.31155e−030
C20 = 3.18692e−034

Various kinds of data

| | |
|---|---|
| Zoom ratio | 1.00 |
| Focal length | 584.99 |
| F-number | 4.12 |
| Angle of field | 2.12 |
| Image height | 21.64 |
| Total lens length | 420.00 |
| BF | 89.03 |
| Entrance pupil position | 1246.91 |
| Exit pupil position | −68.36 |
| Front side principal point position | −342.50 |
| Rear side principal point position | −495.96 |

Lens unit data

| Unit | Start surface | Focal length | Lens configuration Length | Front side principal point Position | Rear side principal point position |
|---|---|---|---|---|---|
| L1 | 1 | 234.00 | 199.68 | 150.47 | −151.28 |
| L1A | 1 | 238.87 | 29.27 | 4.53 | −15.50 |
| L1B | 5 | −249.72 | 16.23 | 17.08 | 6.25 |
| L1C | 8 | 180.27 | 7.00 | 2.71 | −2.03 |
| L2 | 10 | −136.58 | 3.00 | 2.03 | 0.12 |
| L12 | 1 | 542.72 | 205.68 | −470.63 | −362.41 |
| L3 | 12 | 3697.55 | 75.29 | 397.48 | 377.00 |
| L31 | 12 | 230.60 | 19.44 | 14.22 | −2.27 |
| L32 | 16 | −48.22 | 13.10 | 8.66 | −1.19 |
| L33 | 21 | 71.81 | 35.74 | 5.87 | −19.16 |

Single lens data

| Lens | Start surface | Focal length |
|---|---|---|
| 1 | 1 | 525.40 |
| 2 | 3 | 441.69 |
| 3 | 5 | −105.40 |
| 4 | 6 | 165.27 |
| 5 | 8 | 180.27 |
| 6 | 10 | −136.58 |
| 7 | 13 | −137.24 |
| 8 | 14 | 86.31 |
| 9 | 16 | 64.61 |
| 10 | 17 | −42.82 |
| 11 | 19 | −74.80 |
| 12 | 21 | 106.11 |
| 13 | 23 | −59.06 |
| 14 | 24 | 59.93 |
| 15 | 26 | 52.22 |
| 16 | 27 | −64.12 |
| G | 29 | 0.00 |

β of rear side of each lens in the first lens unit during focusing on an infinite object
$\beta_2$ = 1.113423(Lateral magnification of the surface numbers of 3 to 30)
$\beta_3$ = 2.448971(Lateral magnification of the surface numbers of 5 to 30)

-continued f = 584.99 mm Fno = 4.12 2ω = 4.24

$\beta_4$ = 1.324612(Lateral magnification of the surface numbers of 8 to 30)
Combined focal length of the first lens unit and the second lens unit
$f_{12}$ = 542.72

Numerical Example 2 f = 779.99 mm Fno = 5.80 2ω = 3.18

Surface data

| Surface number | r | d | nd | vd | Effective diameter |
|---|---|---|---|---|---|
| 1 (aspherical) | 760.484 | 9.29 | 1.48749 | 70.2 | 134.48 |
| 2 | −629.161 | 0.50 | | | 134.34 |
| 3 | 125.070 | 19.02 | 1.43387 | 95.1 | 130.40 |
| 4 | 898.095 | 100.00 | | | 128.98 |
| 5 | 282.886 | 5.00 | 1.88300 | 40.8 | 66.45 |
| 6 (diffractive) | 49.572 | 13.67 | 1.48749 | 70.2 | 60.58 |
| 7 | 940.062 | 60.42 | | | 59.90 |
| 8 (aspherical) | 359.016 | 4.40 | 1.56732 | 42.8 | 45.75 |
| 9 | −160.298 | 5.00 | | | 45.34 |
| 10 | 3633.709 | 2.70 | 1.69680 | 55.5 | 42.00 |
| 11 | 80.945 | 55.00 | | | 40.47 |
| 12 (stop) | ∞ | 11.00 | | | 32.99 |
| 13 | 80.833 | 1.88 | 1.80000 | 29.8 | 31.21 |
| 14 | 42.298 | 7.81 | 1.48749 | 70.2 | 30.40 |
| 15 | −104.869 | 10.63 | | | 29.82 |
| 16 | 67.224 | 4.07 | 1.84666 | 23.8 | 27.36 |
| 17 | −168.460 | 1.94 | 1.69680 | 55.5 | 26.85 |
| 18 | 36.399 | 5.78 | | | 25.51 |
| 19 | −94.203 | 1.90 | 1.80400 | 46.6 | 25.62 |
| 20 | 83.399 | 3.00 | | | 26.17 |
| 21 | 69.721 | 3.65 | 1.67270 | 32.1 | 28.02 |
| 22 | 783.971 | 5.00 | | | 28.35 |
| 23 | 87.512 | 8.46 | 1.65412 | 39.7 | 29.98 |
| 24 | −31.310 | 2.00 | 1.59282 | 68.6 | 30.04 |
| 25 | 52.243 | 2.95 | | | 29.86 |
| 26 | 50.103 | 9.71 | 1.61340 | 44.3 | 30.92 |
| 27 | −39.939 | 2.00 | 1.80809 | 22.8 | 30.71 |
| 28 | 645.254 | 3.17 | | | 30.95 |
| 29 | ∞ | 2.20 | 1.51633 | 64.1 | 31.31 |
| 30 | ∞ | | | | 31.48 |

Aspherical surface data

First surface

K = 4.82173e+000    A4 = −1.49499e−008    A6 = −1.24684e−014
A8 = −4.89473e−017  A10 = 8.45086e−021    A12 = −6.23176e−025

Eighth surface

K = 0.00000e+000    A4 = 1.93136e−007    A6 = 6.98495e−011
A8 = 8.70070e−015   A10 = −3.33610e−018

Sixth surface (Diffractive surface)

C2 = −4.36096e−005   C4 = −2.92033e−009   C6 = −3.19078e−012
C8 = 9.75558e−015    C10 = −1.47010e−017  C12 = 3.90012e−021
C14 = 7.80322e−024   C16 = −7.97276e−028  C18 = −7.55830e−030
C20 = 3.47923e−033

Various kinds of data

| | |
|---|---|
| Zoom ratio | 1.00 |
| Focal length | 779.99 |
| F-number | 5.80 |
| Angle of field | 1.59 |
| Image height | 21.64 |
| Total lens length | 460.00 |
| BF | 97.84 | f = 779.99 mm Fno = 5.80 2ω = 3.18

| | |
|---|---|
| Entrance pupil position | 1538.32 |
| Exit pupil position | −62.02 |
| Front side principal point position | −1487.36 |
| Rear side principal point position | −682.14 |

Lens unit data

| Unit | Start surface | Focal length | Lens configuration Length | Front side principal point Position | Rear side principal point position |
|---|---|---|---|---|---|
| L1 | 1 | 273.46 | 212.30 | 157.08 | −184.05 |
| L1A | 1 | 226.46 | 28.81 | 4.24 | −15.68 |
| L1B | 5 | −190.80 | 18.67 | 5.19 | −6.67 |
| L1C | 8 | 195.94 | 4.40 | 1.95 | −0.87 |
| L2 | 10 | −118.85 | 2.70 | 1.63 | 0.04 |
| L12 | 1 | 900.89 | 220.00 | −1288.30 | −628.16 |
| L3 | 12 | −8991.20 | 87.15 | 1611.47 | 1304.53 |
| L31 | 12 | 140.40 | 20.69 | 14.05 | −3.36 |
| L32 | 16 | −43.68 | 13.69 | 10.74 | 0.05 |
| L33 | 21 | 73.25 | 39.15 | −0.57 | −27.74 |

Single lens data

| Lens | Start surface | Focal length |
|---|---|---|
| 1 | 1 | 707.84 |
| 2 | 3 | 332.43 |
| 3 | 5 | −69.17 |
| 4 | 6 | 105.82 |
| 5 | 8 | 195.94 |
| 6 | 10 | −118.85 |
| 7 | 13 | −113.37 |
| 8 | 14 | 62.92 |
| 9 | 16 | 57.20 |
| 10 | 17 | −42.79 |
| 11 | 19 | −54.76 |
| 12 | 21 | 113.53 |
| 13 | 23 | 36.27 |
| 14 | 24 | −32.73 |
| 15 | 26 | 37.78 |
| 16 | 27 | −46.48 |
| G | 29 | 0.00 |

β of rear side of each lens in the first lens unit during focusing on an infinite object
$\beta_2$ = 1.101926(Lateral magnification of the surface numbers of 3 to 30)
$\beta_3$ = 3.444245(Lateral magnification of the surface numbers of 5 to 30)
$\beta_4$ = 1.538185(Lateral magnification of the surface numbers of 8 to 30)
Combined focal length of the first lens unit and the second lens unit
$f_{12}$ = 900.89

Numerical Example 3 f = 488.99 mm Fno = 4.11 2ω = 5.06

Surface data

| Surface number | r | d | nd | vd | Effective diameter |
|---|---|---|---|---|---|
| 1 (aspherical) | 397.304 | 11.65 | 1.48749 | 70.2 | 119.00 |
| 2 | −321.651 | 0.10 | | | 118.83 |
| 3 | 89.445 | 17.70 | 1.43387 | 95.1 | 111.04 |
| 4 | 417.367 | 46.80 | | | 109.72 |
| 5 | 566.564 | 3.70 | 1.74400 | 44.8 | 72.01 |

-continued f = 488.99 mm Fno = 4.11 2ω = 5.06

| | | | | | |
|---|---|---|---|---|---|
| 6 (diffractive) | 52.701 | 10.93 | 1.49700 | 81.5 | 64.86 |
| 7 | 231.836 | 20.44 | | | 64.11 |
| 8 | 106.515 | 5.88 | 1.43387 | 95.1 | 54.99 |
| 9 | −479.033 | 2.00 | | | 54.31 |
| 10 | 906.815 | 2.50 | 1.60311 | 60.6 | 52.01 |
| 11 | 81.685 | 56.31 | | | 49.27 |
| 12 (stop) | ∞ | 5.00 | | | 30.29 |
| 13 | 196.626 | 1.80 | 1.80518 | 25.4 | 28.30 |
| 14 | 59.058 | 4.73 | 1.48749 | 70.2 | 27.53 |
| 15 | −128.564 | 3.00 | | | 27.00 |
| 16 | 139.299 | 4.15 | 1.80518 | 25.4 | 26.43 |
| 17 | −54.600 | 1.61 | 1.74320 | 49.3 | 26.24 |
| 18 | 49.923 | 3.44 | | | 25.63 |
| 19 | −126.502 | 1.50 | 1.77250 | 49.6 | 25.83 |
| 20 | 70.386 | 3.00 | | | 26.48 |
| 21 | 64.380 | 4.38 | 1.69895 | 30.1 | 28.80 |
| 22 | −189.604 | 19.56 | | | 29.20 |
| 23 | −59.603 | 2.00 | 1.59282 | 68.6 | 32.78 |
| 24 | 35.328 | 8.62 | 1.61340 | 44.3 | 35.88 |
| 25 | −113.243 | 0.50 | | | 36.58 |
| 26 | 93.777 | 8.70 | 1.65412 | 39.7 | 37.79 |
| 27 | −41.426 | 1.80 | 1.80809 | 22.8 | 37.83 |
| 28 | −271.651 | 5.00 | | | 38.41 |
| 29 | ∞ | 2.20 | 1.51633 | 64.1 | 38.82 |
| 30 | ∞ | | | | 38.92 |

Aspehrical surface data

First surface

K = −5.25189e+000   A4 = −2.00466e−008   A6 = −3.28508e−013
A8 = −4.41786e−017   A10 = 1.72103e−020   A12 = −1.76288e−024

Sixth surface (Diffractive surface)

C2 = −4.26153e−005   C4 = 6.04917e−009   C6 = −4.17415e−012
C8 = 5.65636e−015   C10 = −1.30431e−018

Various kinds of data

| | |
|---|---|
| Zoom ratio | 1.00 |
| Focal length | 488.99 |
| F-number | 4.11 |
| Angle of field | 2.53 |
| Image height | 21.64 |
| Total lens length | 320.00 |
| BF | 61.00 |
| Entrance pupil position | 797.52 |
| Exit pupil position | −82.46 |
| Front side principal point position | −380.30 |
| Rear side principal point position | −427.99 |

Lens unit data

| Unit | Start surface | Focal length | Lens configuration Length | Front side principal point Position | Rear side principal point position |
|---|---|---|---|---|---|
| L1 | 1 | 170.17 | 117.19 | 27.77 | −94.86 |
| L1A | 1 | 151.56 | 29.45 | 4.54 | −15.58 |
| L1B | 5 | −183.00 | 14.63 | 5.51 | −3.87 |
| L1C | 8 | 201.45 | 5.88 | 0.75 | −3.36 |
| L2 | 10 | −149.02 | 2.50 | 1.72 | 0.15 |
| L12 | 1 | 327.53 | 121.69 | −188.91 | −189.58 |
| L3 | 12 | −453.91 | 81.00 | −68.23 | −162.76 |
| L31 | 12 | 395.38 | 11.53 | 9.16 | −0.03 |
| L32 | 16 | −39.97 | 10.70 | 6.87 | −0.74 |
| L33 | 21 | 64.98 | 52.77 | 10.11 | −36.69 |

Single lens data

| Lens | Start surface | Focal length |
|---|---|---|
| 1 | 1 | 366.57 |
| 2 | 3 | 258.17 |
| 3 | 5 | −78.87 |
| 4 | 6 | 132.96 |
| 5 | 8 | 201.45 |
| 6 | 10 | −149.02 |
| 7 | 13 | −105.45 |
| 8 | 14 | 83.70 |
| 9 | 16 | 49.19 |
| 10 | 17 | −34.86 |
| 11 | 19 | −58.35 |
| 12 | 21 | 69.25 |
| 13 | 23 | −37.12 |
| 14 | 24 | 44.89 |
| 15 | 26 | 45.07 |
| 16 | 27 | −60.70 |
| G | 29 | 0.00 |

β of rear side of each lens in the first lens unit during focusing on an infinite object
$\beta_2$ = 1.333982(Lateral magnification of the surface numbers of 3 to 30)
$\beta_3$ = 3.226446(Lateral magnification of the surface numbers of 5 to 30)
$\beta_4$ = 1.751301(Lateral magnification of the surface numbers of 8 to 30)
Combined focal length of the first lens unit and the second lens unit
$f_{12}$ = 327.53

Numerical Example 4 f = 488.99 mm Fno = 5.70 2ω = 5.06

Surface data

| Surface number | r | d | nd | vd | Effective diameter |
|---|---|---|---|---|---|
| 1 (aspherical) | 476.765 | 5.51 | 1.48749 | 70.2 | 85.79 |
| 2 | −496.821 | 0.10 | | | 85.71 |
| 3 | 86.888 | 12.32 | 1.43387 | 95.1 | 83.85 |
| 4 | 1853.868 | 51.65 | | | 83.00 |
| 5 | 90.286 | 3.70 | 1.88300 | 40.8 | 50.28 |
| 6 (diffractive) | 32.248 | 6.91 | 1.48749 | 70.2 | 44.86 |
| 7 | 60.844 | 2.00 | | | 44.28 |
| 8 | 40.608 | 8.91 | 1.48749 | 70.2 | 44.05 |
| 9 | −256.977 | 2.58 | | | 43.39 |
| 10 | 9408.721 | 2.50 | 1.51633 | 64.1 | 40.64 |
| 11 | 49.085 | 41.01 | | | 37.56 |
| 12 (stop) | ∞ | 11.00 | | | 25.16 |
| 13 | 826.153 | 2.99 | 1.48749 | 70.2 | 22.19 |
| 14 | −55.391 | 1.00 | | | 22.18 |
| 15 | 83.489 | 3.17 | 1.62588 | 35.7 | 21.59 |
| 16 | −53.280 | 2.00 | 1.88300 | 40.8 | 21.27 |
| 17 | 56.342 | 2.66 | | | 20.70 |
| 18 | 131.220 | 3.39 | 1.75520 | 27.5 | 20.84 |
| 19 | −37.001 | 1.61 | 1.72916 | 54.7 | 20.80 |
| 20 | 48.804 | 2.17 | | | 20.63 |
| 21 | −217.467 | 1.50 | 1.80400 | 46.6 | 20.83 |
| 22 | 58.202 | 3.00 | | | 21.33 |
| 23 | 52.904 | 4.46 | 1.60342 | 38.0 | 23.59 |
| 24 | −91.286 | 8.01 | | | 24.10 |
| 25 | −44.923 | 2.00 | 1.59282 | 68.6 | 25.41 |
| 26 | 23.379 | 7.31 | 1.61340 | 44.3 | 28.29 |
| 27 | −216.829 | 6.32 | | | 28.92 |
| 28 | 78.516 | 8.73 | 1.65412 | 39.7 | 32.46 |
| 29 | −29.747 | 1.80 | 1.80809 | 22.8 | 32.62 |
| 30 | −151.555 | 2.50 | | | 33.63 |
| 31 | ∞ | 2.20 | 1.51633 | 64.1 | 34.10 |
| 32 | ∞ | | | | 34.30 |

Aspherical surface data

First surface

K = −1.52607e+001   A4 = −6.59962e−008   A6 = −2.12194e−012
A8 = −1.84794e−016   A10 = 1.68254e−019   A12 = −5.13172e−023

-continued f = 488.99 mm Fno = 5.70 2ω = 5.06

Sixth surface (Diffractive surface)

C2 = −4.43400e−005    C4 = −1.57083e−008    C6 = 1.79439e−011
C8 = −1.39118e−013    C10 = 3.83592e−016    C12 = −1.31338e−019
C14 = −1.17696e−021   C16 = 9.23351e−026    C18 = 5.32235e−027
C20 = −5.58119e−030

Various kinds of data

| | |
|---|---|
| Zoom ratio | 1.00 |
| Focal length | 488.99 |
| F-number | 5.70 |
| Angle of field | 2.53 |
| Image height | 21.64 |
| Total lens length | 280.01 |
| BF | 65.01 |
| Entrance pupil position | 493.65 |
| Exit pupil position | −74.70 |
| Front side principal point position | −728.94 |
| Rear side principal point position | −423.99 |

Lens unit data

| Unit | Start surface | Focal length | Lens configuration Length | Front side principal point Position | Rear side principal point position |
|---|---|---|---|---|---|
| L1 | 1 | 115.20 | 91.09 | 37.12 | −59.06 |
| L1A | 1 | 148.05 | 17.92 | 2.93 | −9.46 |
| L1B | 5 | −99.00 | 10.61 | 7.70 | 0.91 |
| L1C | 8 | 72.65 | 8.91 | 0.83 | −5.22 |
| L2 | 10 | −95.57 | 2.50 | 1.66 | 0.01 |
| L12 | 1 | 252.13 | 96.17 | −129.86 | −138.52 |
| L3 | 12 | −147.48 | 77.83 | 1.16 | −73.55 |
| L31 | 12 | −383.32 | 20.16 | 40.12 | 21.57 |
| L32 | 18 | −38.62 | 8.67 | 5.53 | −0.41 |
| L33 | 23 | 62.99 | 43.33 | 9.14 | −27.63 |

Single lens data

| Lens | Start surface | Focal length |
|---|---|---|
| 1 | 1 | 500.00 |
| 2 | 3 | 209.67 |
| 3 | 5 | −58.86 |
| 4 | 6 | 128.88 |
| 5 | 8 | 72.65 |
| 6 | 10 | −95.57 |
| 7 | 13 | 106.60 |
| 8 | 15 | 52.43 |
| 9 | 16 | −30.75 |
| 10 | 18 | 38.55 |
| 11 | 19 | −28.64 |
| 12 | 21 | −56.97 |
| 13 | 23 | 56.16 |
| 14 | 25 | −25.66 |
| 15 | 26 | 34.81 |
| 16 | 28 | 34.07 |
| 17 | 29 | −46.11 |
| G | 31 | 0.00 |

β of rear side of each lens in the first lens unit during focusing on an infinite object
$\beta_2$ = 0.977984 (Lateral magnification of the surface numbers of 3 to 32)
$\beta_3$ = 3.302878 (Lateral magnification of the surface numbers of 5 to 32)
$\beta_4$ = 0.659209 (Lateral magnification of the surface numbers of 8 to 32)
Combined focal length of the first lens unit and the second lens unit
$f_{12}$ = 252.13

Numerical Example 5 f = 584.96 mm Fno = 4.12 2ω = 4.24

Surface data

| Surface number | r | d | nd | vd | Effective diameter |
|---|---|---|---|---|---|
| 1 (aspherical) | 1425.908 | 12.50 | 1.48749 | 70.2 | 141.98 |
| 2 | −317.829 | 0.50 | | | 141.94 |
| 3 | 122.327 | 17.01 | 1.43387 | 95.1 | 134.85 |
| 4 | 358.155 | 89.77 | | | 133.20 |
| 5 | 113.474 | 4.20 | 1.88300 | 40.8 | 76.69 |
| 6 | 49.809 | 1.00 | | | 69.04 |
| 7 (diffractive) | 50.547 | 12.28 | 1.49700 | 81.5 | 69.34 |
| 8 | 116.003 | 54.76 | | | 67.94 |
| 9 (aspherical) | 203.033 | 7.00 | 1.48749 | 70.2 | 53.29 |
| 10 | −157.576 | 3.02 | | | 52.44 |
| 11 | 1225.729 | 3.00 | 1.57099 | 50.8 | 49.03 |
| 12 | 72.112 | 50.00 | | | 46.37 |
| 13 (stop) | ∞ | 11.00 | | | 34.83 |
| 14 | 133.313 | 2.00 | 1.83481 | 42.7 | 31.84 |
| 15 | 61.741 | 6.49 | 1.48749 | 70.2 | 31.10 |
| 16 | −127.049 | 3.62 | | | 30.44 |
| 17 | 99.543 | 4.71 | 1.75520 | 27.5 | 29.83 |
| 18 | −94.492 | 1.70 | 1.69680 | 55.5 | 29.46 |
| 19 | 44.211 | 4.94 | | | 28.58 |
| 20 | −108.848 | 2.00 | 1.69680 | 55.5 | 28.88 |
| 21 | 98.332 | 4.00 | | | 29.79 |
| 22 | 90.988 | 5.11 | 1.61340 | 44.3 | 32.51 |
| 23 | −241.435 | 3.00 | | | 33.20 |
| 24 | −91.605 | 2.00 | 1.59282 | 68.6 | 33.76 |
| 25 | 58.647 | 8.52 | 1.61340 | 44.3 | 35.77 |
| 26 | −97.149 | 0.30 | | | 36.97 |
| 27 | 72.390 | 7.70 | 1.74950 | 35.3 | 38.13 |
| 28 | −78.081 | 2.00 | 1.80809 | 22.8 | 37.87 |
| 29 | 156.067 | 5.00 | | | 37.47 |
| 30 | ∞ | 2.00 | 1.51633 | 64.1 | 37.71 |
| 31 | ∞ | | | | 37.79 |

Aspherical surface data

First surface

K = 0.00000e+000    A4 = −2.17713e−008    A6 = −1.17506e−013
A8 = 2.06838e−017   A10 = −1.46626e−021

Ninth surface

K = −4.12136e−001   A4 = 1.36972e−007    A6 = 2.28578e−011
A8 = 4.64410e−014   A10 = −3.25549e−017

Seventh surface (Diffractive surface)

C2 = −3.92880e−005   C4 = −1.43250e−009    C6 = −3.78534e−013
C8 = −9.84054e−015   C10 = 2.02008e−017    C12 = −1.58310e−020
C14 = 2.54095e−024   C16 = 3.71644e−027    C18 = −2.49284e−030
C20 = 4.95371e−034

Various kinds of data

| | |
|---|---|
| Zoom ratio | 1.00 |
| Focal length | 584.96 |
| F-number | 4.12 |
| Angle of field | 2.12 |
| Image height | 21.64 |
| Total lens length | 420.00 |
| BF | 88.88 |
| Entrance pupil position | 1243.92 |
| Exit pupil position | −69.49 |
| Front side principal point position | −331.67 |
| Rear side principal point position | −496.08 |

Lens unit data

| Unit | Start surface | Focal length | Lens configuration Length | Front side principal point Position | Rear side principal point position |
|---|---|---|---|---|---|
| L1 | 1 | 234.00 | 199.02 | 148.69 | −151.38 |
| L1A | 1 | 233.89 | 30.01 | 4.66 | −15.89 |

-continued f = 584.96 mm Fno = 4.12 2ω = 4.24

| | | | | |
|---|---|---|---|---|
| L1B | 5 | −247.00 | 17.48 | 13.96 | 2.30 |
| L1C | 9 | 183.16 | 7.00 | 2.67 | −2.07 |
| L2 | 11 | −134.31 | 3.00 | 2.03 | 0.12 |
| L12 | 1 | 553.84 | 205.04 | −496.35 | −370.13 |
| L3 | 13 | 2425.80 | 76.08 | 262.78 | 225.21 |
| L31 | 13 | 223.49 | 19.49 | 14.33 | −2.18 |
| L32 | 17 | −48.06 | 13.35 | 8.92 | −1.08 |
| L33 | 22 | 71.59 | 35.62 | 6.05 | −18.98 |

Single lens data

| Lens | Start surface | Focal length |
|---|---|---|
| 1 | 1 | 534.39 |
| 2 | 3 | 419.05 |
| 3 | 5 | −103.75 |
| 4 | 7 | 167.37 |
| 5 | 9 | 183.16 |
| 6 | 11 | −134.31 |
| 7 | 14 | −139.53 |
| 8 | 15 | 86.20 |
| 9 | 17 | 64.87 |
| 10 | 18 | −43.01 |
| 11 | 20 | −73.85 |
| 12 | 22 | 108.37 |
| 13 | 24 | −60.02 |
| 14 | 25 | 60.88 |
| 15 | 27 | 51.24 |
| 16 | 28 | −64.16 |
| G | 30 | 0.00 |

β of rear side of each lens in the first lens unit during focusing on an infinite object
$\beta_2$ = 1.094631 (Lateral magnification of the surface numbers of 3 to 31)
$\beta_3$ = 2.500983 (Lateral magnification of the surface numbers of 5 to 31)
$\beta_4$ = −0.491275 (Lateral magnification of the surface numbers of 7 to 31)
$\beta_5$ = 1.343973 (Lateral magnification of the surface numbers of 9 to 31)
Combined focal length of the first lens unit and the second lens unit
$f_{12}$ = 553.84

Numerical Example 6 f = 584.97 mm Fno = 4.12 2ω = 4.24

Surface data

| Surface number | r | d | nd | vd | Effective diameter |
|---|---|---|---|---|---|
| 1 | 475.006 | 8.35 | 1.48749 | 70.2 | 141.98 |
| 2(diffractive) | ∞ | 5.19 | 1.48749 | 70.2 | 141.69 |
| 3 | −1142.700 | 0.50 | | | 141.38 |
| 4(aspherical) | 129.022 | 19.00 | 1.43387 | 95.1 | 136.74 |
| 5 | 701.235 | 97.45 | | | 135.26 |
| 6 | 254.903 | 4.20 | 1.88300 | 40.8 | 73.94 |
| 7 | 66.635 | 10.78 | 1.49700 | 81.5 | 68.75 |
| 8 | 326.434 | 46.12 | | | 67.86 |
| 9(aspherical) | 80.814 | 7.00 | 1.48749 | 70.2 | 51.43 |
| 10 | 515.314 | 3.31 | | | 49.91 |
| 11 | 3420.780 | 3.00 | 1.57099 | 50.8 | 48.17 |
| 12 | 65.915 | 50.00 | | | 45.44 |
| 13(stop) | ∞ | 11.00 | | | 36.06 |
| 14 | 122.164 | 2.00 | 1.83481 | 42.7 | 33.58 |
| 15 | 63.945 | 6.99 | 1.48749 | 70.2 | 32.87 |
| 16 | −107.850 | 11.60 | | | 32.26 |
| 17 | 116.288 | 4.76 | 1.75520 | 27.5 | 29.30 |
| 18 | −78.632 | 1.70 | 1.69680 | 55.5 | 28.96 |
| 19 | 47.798 | 4.66 | | | 28.17 |
| 20 | −110.245 | 2.00 | 1.69680 | 55.5 | 28.44 |
| 21 | 80.015 | 4.00 | | | 29.32 |
| 22 | 80.693 | 5.08 | 1.61340 | 44.3 | 32.11 |
| 23 | −360.442 | 3.00 | | | 32.80 |
| 24 | −104.034 | 2.00 | 1.59282 | 68.6 | 33.41 |
| 25 | 138.445 | 6.49 | 1.61340 | 44.3 | 34.80 |
| 26 | −118.722 | 0.30 | | | 36.03 |
| 27 | 87.149 | 7.46 | 1.74950 | 35.3 | 37.14 |
| 28 | −68.989 | 2.00 | 1.80809 | 22.8 | 37.09 |
| 29 | 437.741 | 5.00 | | | 37.09 |
| 30 | ∞ | 2.00 | 1.51633 | 64.1 | 37.41 |
| 31 | ∞ | | | | 37.50 |

Aspherical surface data

Fourth surface

K = −6.37689e−002  A4 = −7.34265e−009  A6 = −6.89356e−013
A8 = 2.40665e−017  A10 = −5.82211e−021  A12 = 1.47896e−025

Ninth surface

K = −7.99756e−002  A4 = −1.91383e−008  A6 = 5.02829e−012
A8 = 1.89373e−015  A10 = 2.13329e−019

Second surface (Diffractive surface)

C2 = −9.85284e−006  C4 = 2.07729e−010  C6 = −2.25860e−014
C8 = −1.11708e−017  C10 = 2.28295e−021  C12 = 1.98737e−025
C14 = −2.13222e−029  C16 = −7.53789e−033  C18 = −2.63284e−037
C20 = 1.49734e−040

Various kinds of data
Zoom ratio 1.00

| | |
|---|---|
| Focal length | 584.97 |
| F-number | 4.12 |
| Angle of field | 2.12 |
| Image height | 21.64 |
| Total lens length | 419.89 |
| BF | 82.96 |
| Entrance pupil position | 1225.69 |
| Exit pupil position | −77.14 |
| Front side principal point position | −326.72 |
| Rear side principal point position | −502.01 |

Lens unit data

| Unit | Start surface | Focal length | Lens configuration Length | Front side principal point Position | Rear side principal point position |
|---|---|---|---|---|---|
| L1 | 1 | 234.00 | 198.58 | 125.65 | −152.62 |
| L1A | 1 | 236.74 | 33.03 | 5.31 | −17.45 |
| L1B | 6 | −261.80 | 14.98 | 7.18 | −2.28 |
| L1C | 9 | 195.58 | 7.00 | −0.87 | −5.55 |
| L2 | 11 | −117.75 | 3.00 | 1.95 | 0.04 |
| L12 | 1 | 661.94 | 204.89 | −761.89 | −446.56 |
| L3 | 13 | 756.09 | 82.04 | 65.89 | −4.96 |
| L31 | 13 | 169.54 | 19.99 | 14.45 | −2.41 |
| L32 | 17 | −44.90 | 13.12 | 8.66 | −1.05 |
| L33 | 22 | 69.08 | 33.33 | 6.18 | −17.68 |

Single lens data

| Lens | Start surface | Focal length |
|---|---|---|
| 1 | 1 | 956.14 |
| 2 | 2 | 2240.70 |
| 3 | 4 | 360.80 |
| 4 | 6 | −103.26 |
| 5 | 7 | 166.17 |
| 6 | 9 | 195.58 |
| 7 | 11 | −117.75 |
| 8 | 14 | −163.28 |
| 9 | 15 | 83.46 |

-continued

| f = 584.97 mm Fno = 4.12 2ω = 4.24 | | |
|---|---|---|
| 10 | 17 | 62.78 |
| 11 | 18 | −42.43 |
| 12 | 20 | −66.25 |
| 13 | 22 | 107.96 |
| 14 | 24 | −99.89 |
| 15 | 25 | 105.21 |
| 16 | 27 | 52.45 |
| 17 | 28 | −73.62 |
| G | 30 | 0.00 |

β of rear side of each lens in the first lens unit during focusing on an infinite object
$\beta_2$ = 0.859016(Lateral magnification of the surface numbers of 4 to 31)
$\beta_3$ = 2.470923(Lateral magnification of the surface numbers of 6 to 31)
$\beta_4$ = 1.388665(Lateral magnification of the surface numbers of 9 to 31)
Combined focal length of the first lens unit and the second lens unit
$f_{12}$ = 661.94

Numerical Example 7

| f = 584.99 mm Fno = 4.12 2ω = 4.24 | | | | | |
|---|---|---|---|---|---|
| Surface data | | | | | |
| Surface number | r | d | nd | vd | Effective diameter |
| 1(aspherical) | 1425.908 | 12.50 | 1.48749 | 70.2 | 141.99 |
| 2 | −307.397 | 0.50 | | | 141.96 |
| 3 | 125.786 | 16.32 | 1.43387 | 95.1 | 134.77 |
| 4 | 342.857 | 90.92 | | | 133.00 |
| 5 | 100.206 | 4.20 | 1.88300 | 40.8 | 77.18 |
| 6(diffractive) | 48.006 | 12.00 | 1.49700 | 81.5 | 69.21 |
| 7 | 96.988 | 54.40 | | | 67.77 |
| 8(aspherical) | 175.992 | 2.00 | 1.71700 | 47.9 | 53.97 |
| 9 | 112.893 | 7.71 | 1.51633 | 64.1 | 53.07 |
| 10 | −161.456 | 3.03 | | | 52.41 |
| 11 | 1190.004 | 3.00 | 1.57099 | 50.8 | 49.03 |
| 12 | 73.995 | 50.00 | | | 46.43 |
| 13(stop) | ∞ | 11.00 | | | 34.46 |
| 14 | 132.310 | 2.00 | 1.83481 | 42.7 | 31.37 |
| 15 | 60.597 | 6.41 | 1.48749 | 70.2 | 30.61 |
| 16 | −132.000 | 3.00 | | | 29.94 |
| 17 | 102.546 | 4.67 | 1.75520 | 27.5 | 28.14 |
| 18 | −91.025 | 1.70 | 1.69680 | 55.5 | 27.80 |
| 19 | 44.555 | 4.87 | | | 27.10 |
| 20 | −109.897 | 2.00 | 1.69680 | 55.5 | 27.49 |
| 21 | 96.936 | 4.00 | | | 28.36 |
| 22 | 92.914 | 5.14 | 1.61340 | 44.3 | 31.01 |
| 23 | −209.388 | 3.00 | | | 31.76 |
| 24 | −86.701 | 2.00 | 1.59282 | 68.6 | 32.35 |
| 25 | 59.799 | 8.53 | 1.61340 | 44.3 | 34.28 |
| 26 | −93.175 | 0.30 | | | 35.60 |
| 27 | 70.626 | 7.64 | 1.74950 | 35.3 | 36.74 |
| 28 | −82.384 | 2.00 | 1.80809 | 22.8 | 36.46 |
| 29 | 144.949 | 5.00 | | | 36.10 |
| 30 | ∞ | 2.00 | 1.51633 | 64.1 | 36.40 |
| 31 | ∞ | | | | 36.50 |

Aspherical surface data

First surface

K = 0.00000e+000   A4 = −2.29528e−008   A6 = −1.12849e−013
A8 = 1.90778e−017   A10 = −1.33716e−021

Eighth surface

K = −4.94625e−001   A4 = 1.34701e−007   A6 = 3.67659e−011
A8 = 6.29464e−015   A10 = 1.93458e−018

Sixth surface (Diffractive surface)

C2 = −3.96910e−005   C4 = −2.60235e−009   C6 = 2.32784e−013
C8 = −1.00827e−014   C10 = 2.00981e−017   C12 = −1.61122e−020
C14 = 2.58520e−024   C16 = 3.97268e−027   C18 = −2.33111e−030
C20 = 3.37125e−034

Various kinds of data
Zoom ratio 1.00

| Focal length | 584.99 |
|---|---|
| F-number | 4.12 |
| Angle of field | 2.12 |
| Image height | 21.64 |
| Total length length | 420.00 |
| BF | 88.15 |
| Entrance pupil position | 1247.51 |
| Exit pupil position | −68.65 |
| Front side principal point position | −349.94 |
| Rear side principal point position | −496.84 |

Lens unit data

| Unit | Start surface | Focal length | Lens configuration Length | Front side principal point Position | Rear side principal point position |
|---|---|---|---|---|---|
| L1 | 1 | 234.78 | 200.55 | 144.56 | −151.85 |
| L1A | 1 | 239.47 | 29.32 | 4.55 | −15.53 |
| L1B | 5 | −251.56 | 16.20 | 17.86 | 6.98 |
| L1C | 8 | 183.48 | 9.71 | 3.29 | −3.02 |
| L2 | 11 | −138.32 | 3.00 | 2.04 | 0.13 |
| L12 | 1 | 537.14 | 206.58 | −464.80 | −358.88 |
| L3 | 13 | 4689.01 | 75.27 | 511.83 | 505.89 |
| L31 | 13 | 233.91 | 19.41 | 14.22 | −2.23 |
| L32 | 17 | −47.71 | 13.25 | 8.79 | −1.12 |
| L33 | 22 | 71.09 | 35.62 | 6.02 | −18.98 |

Single lens data

| Lens | Start surface | Focal length |
|---|---|---|
| 1 | 1 | 519.97 |
| 2 | 3 | 447.73 |
| 3 | 5 | −109.38 |
| 4 | 6 | 174.32 |
| 5 | 8 | −445.04 |
| 6 | 9 | 129.92 |
| 7 | 11 | −138.32 |
| 8 | 14 | −135.65 |
| 9 | 15 | 86.13 |
| 10 | 17 | 64.52 |
| 11 | 18 | −42.71 |
| 12 | 20 | −73.62 |
| 13 | 22 | 105.60 |
| 14 | 24 | −59.40 |
| 15 | 25 | 60.67 |
| 16 | 27 | 51.85 |
| 17 | 28 | −64.75 |
| G | 30 | 0.00 |

β of rear side of each lens in the first lens unit during focusing on an infinite object
$\beta_2$ = 1.125051(Lateral magnification of the surface numbers of 3 to 31)
$\beta_3$ = 2.442828(Lateral magnification of the surface numbers of 5 to 31)
$\beta_4$ = 1.324515(Lateral magnification of the surface numbers of 8 to 31)
Combined focal length of the first lens unit and the second lens unit
$f_{12}$ = 537.14

Numerical Example 8 f = 585.00 mm Fno = 4.12 2ω = 4.24

Surface data

| Surface number | r | d | nd | vd | Effective diameter |
|---|---|---|---|---|---|
| 1(aspherical) | 570.363 | 17.50 | 1.48749 | 70.2 | 141.99 |
| 2 | −223.144 | 101.84 | | | 141.96 |
| 3 | 153.396 | 15.16 | 1.43387 | 95.1 | 98.74 |
| 4 | −392.996 | 10.00 | | | 96.94 |
| 5 | 101.100 | 4.20 | 1.88300 | 40.8 | 79.81 |
| 6(diffractive) | 46.884 | 11.85 | 1.48749 | 70.2 | 70.07 |
| 7 | 77.130 | 35.26 | | | 67.91 |
| 8(aspherical) | 158.783 | 8.00 | 1.48749 | 70.2 | 57.67 |
| 9 | −193.428 | 6.77 | | | 56.54 |
| 10 | 594.556 | 3.00 | 1.72000 | 50.2 | 49.48 |
| 11 | 71.752 | 50.00 | | | 46.57 |
| 12(stop) | ∞ | 11.00 | | | 32.79 |
| 13 | 154.358 | 2.00 | 1.88300 | 40.8 | 29.29 |
| 14 | 63.925 | 6.02 | 1.48749 | 70.2 | 28.57 |
| 15 | −120.573 | 3.00 | | | 27.87 |
| 16 | 95.547 | 4.20 | 1.75520 | 27.5 | 26.68 |
| 17 | −77.601 | 1.70 | 1.72916 | 54.7 | 26.42 |
| 18 | 40.248 | 4.99 | | | 25.76 |
| 19 | −99.709 | 2.00 | 1.72916 | 54.7 | 26.31 |
| 20 | 131.126 | 4.00 | | | 27.27 |
| 21 | 87.759 | 5.32 | 1.62588 | 35.7 | 30.27 |
| 22 | −162.461 | 3.00 | | | 31.06 |
| 23 | −75.968 | 2.00 | 1.59282 | 68.6 | 31.62 |
| 24 | 39.954 | 10.01 | 1.61340 | 44.3 | 34.07 |
| 25 | −88.338 | 0.30 | | | 35.44 |
| 26 | 73.105 | 8.55 | 1.74950 | 35.3 | 36.54 |
| 27 | −55.157 | 2.00 | 1.80809 | 22.8 | 36.28 |
| 28 | 155.904 | 5.00 | | | 35.94 |
| 29 | ∞ | 2.00 | 1.51633 | 64.1 | 36.28 |
| 30 | ∞ | | | | 36.40 |

Aspherical surface data

First surface

K = −3.11334e+001   A4 = −5.87845e−008   A6 = −1.05457e−012
A8 = 1.00743e−016   A10 = −3.78864e−021

Eighth surface

K = −3.56990e+000   A4 = 4.44588e−007   A6 = 9.23332e−011
A8 = −2.52278e−014  A10 = 2.36989e−017

Sixth surface (Diffractive surface)

C2 = −4.28779e−005   C4 = −7.91727e−009   C6 = 6.91143e−012
C8 = −2.35760e−014   C10 = 2.87129e−017   C12 = −1.24028e−020
C14 = −4.46710e−024  C16 = 3.48824e−027   C18 = 1.78080e−030
C20 = −1.12866e−033

Various kinds of data
Zoom ratio 1.00

| | |
|---|---|
| Focal length | 585.00 |
| F-number | 4.12 |
| Angle of field | 2.12 |
| Image height | 21.64 |
| Total lens length | 420.00 |
| BF | 79.33 |
| Entrance pupil position | 1189.18 |
| Exit pupil position | −71.38 |
| Front side principal point position | −496.57 |
| Rear side principal point position | −505.67 |

Lens unit data

| Unit | Start surface | Focal length | Lens configuration Length | Front side principal point Position | Rear side principal point position |
|---|---|---|---|---|---|
| L1 | 1 | 197.21 | 203.81 | 137.15 | −122.71 |
| L1A | 1 | 177.18 | 134.50 | 83.25 | −65.49 |
| L1B | 5 | −177.83 | 16.05 | 14.94 | 4.24 |
| L1C | 8 | 180.22 | 8.00 | 2.44 | −2.98 |
| L2 | 10 | −113.61 | 3.00 | 1.99 | 0.24 |
| L12 | 1 | 468.00 | 213.58 | −404.45 | −311.76 |
| L3 | 12 | −1309.25 | 77.09 | −155.60 | −247.96 |
| L31 | 12 | 278.04 | 19.02 | 14.95 | −1.21 |
| L32 | 16 | −44.18 | 12.89 | 7.92 | −1.74 |
| L33 | 21 | 67.91 | 38.18 | 6.31 | −20.28 |

Single lens data

| Lens | Start surface | Focal length |
|---|---|---|
| 1 | 1 | 331.41 |
| 2 | 3 | 256.45 |
| 3 | 5 | −103.64 |
| 4 | 6 | 213.17 |
| 5 | 8 | 180.22 |
| 6 | 10 | −113.61 |
| 7 | 13 | −124.87 |
| 8 | 14 | 86.62 |
| 9 | 16 | 57.30 |
| 10 | 17 | −36.13 |
| 11 | 19 | −77.40 |
| 12 | 21 | 91.79 |
| 13 | 23 | −43.89 |
| 14 | 24 | 46.22 |
| 15 | 26 | 43.18 |
| 16 | 27 | −50.21 |
| G | 29 | 0.00 |

β of rear side of each lens in the first lens unit during focusing on an infinite object
$\beta_2$ = 1.765160 (Lateral magnification of the surface numbers of 3 to 30)
$\beta_3$ = 3.301811 (Lateral magnification of the surface numbers of 5 to 30)
$\beta_4$ = 1.691282 (Lateral magnification of the surface numbers of 8 to 30)
Combined focal length of the first lens unit and the second lens unit
$f_{12}$ = 468.00

Numerical Example 9 f = 488.99 mm Fno = 5.70 2ω = 5.06

Surface data

| Surface number | r | d | nd | vd | Effective diameter |
|---|---|---|---|---|---|
| 1(aspherical) | 1060.812 | 7.87 | 1.43387 | 95.1 | 85.79 |
| 2 | −174.666 | 0.10 | | | 85.78 |
| 3 | 70.309 | 11.38 | 1.43387 | 95.1 | 81.54 |
| 4 | 223.604 | 51.18 | | | 80.41 |
| 5 | 91.679 | 3.70 | 1.80400 | 46.6 | 47.31 |
| 6 | 29.991 | 6.82 | 1.43387 | 95.1 | 41.85 |
| 7 | 59.574 | 2.00 | | | 41.24 |
| 8 | 36.875 | 8.07 | 1.43387 | 95.1 | 40.70 |
| 9 | −446.247 | 2.00 | | | 40.00 |
| 10 | −1295.347 | 2.50 | 1.60311 | 60.6 | 38.30 |
| 11 | 54.530 | 39.90 | | | 35.87 |
| 12(stop) | ∞ | 11.00 | | | 25.81 |
| 13 | 167.281 | 3.33 | 1.51742 | 52.4 | 23.19 |
| 14 | −64.161 | 1.00 | | | 23.17 |
| 15 | 95.024 | 3.30 | 1.62588 | 35.7 | 22.58 |
| 16 | −52.904 | 2.00 | 1.80610 | 33.3 | 22.25 |
| 17 | 52.977 | 4.29 | | | 21.58 |
| 18 | 102.690 | 3.57 | 1.80518 | 25.4 | 21.76 |
| 19 | −40.530 | 1.61 | 1.77250 | 49.6 | 21.66 |
| 20 | 48.970 | 2.16 | | | 21.32 |
| 21 | −312.560 | 1.50 | 1.88300 | 40.8 | 21.49 |
| 22 | 56.932 | 3.00 | | | 21.88 |
| 23 | 53.955 | 4.54 | 1.66680 | 33.0 | 24.07 |
| 24 | −90.740 | 7.61 | | | 24.50 |
| 25 | −45.334 | 2.00 | 1.59282 | 68.6 | 25.33 |
| 26 | 23.149 | 6.95 | 1.61340 | 44.3 | 27.80 |

-continued f = 488.99 mm Fno = 5.70 2ω = 5.06

| | | | | | |
|---|---|---|---|---|---|
| 27 | −606.529 | 6.30 | | | 28.37 |
| 28 | 75.876 | 8.81 | 1.65412 | 39.7 | 31.67 |
| 29 | −30.138 | 1.80 | 1.80809 | 22.8 | 31.84 |
| 30 | −182.472 | 2.50 | | | 32.76 |
| 31 | ∞ | 2.20 | 1.51633 | 64.1 | 33.25 |
| 32 | ∞ | | | | 33.47 |

Aspherical surface data
First surface

K = −4.07013e+002    A4 = −6.54214e−008    A6 = −8.69411e−012
A8 = 1.87393e−015    A10 = −4.20368e−019   A12 = 5.23053e−023

Various kinds of data
Zoom ratio 1.00

| | |
|---|---|
| Focal length | 488.99 |
| F-number | 5.70 |
| Angle of field | 2.53 |
| Image height | 21.64 |
| Total lens length | 280.00 |
| BF | 65.01 |
| Entrance pupil position | 506.39 |
| Exit pupil position | −70.01 |
| Front side principal point position | −775.53 |
| Rear side principal point position | −423.98 |

Lens unit data

| Unit | Start surface | Focal length | Lens configuration Length | Front side principal point Position | Rear side principal point position |
|---|---|---|---|---|---|
| L1 | 1 | 121.55 | 91.13 | 26.22 | −66.15 |
| L1A | 1 | 138.00 | 19.35 | 3.12 | −10.26 |
| L1B | 5 | −94.18 | 10.52 | 7.14 | 0.19 |
| L1C | 8 | 78.90 | 8.07 | 0.43 | −5.23 |
| L2 | 10 | −86.70 | 2.50 | 1.50 | −0.06 |
| L12 | 1 | 302.90 | 95.63 | −217.09 | −173.61 |
| L3 | 12 | −198.94 | 79.46 | 13.68 | −57.21 |
| L31 | 12 | 5346.33 | 20.62 | −380.94 | −370.96 |
| L32 | 18 | −39.90 | 8.85 | 6.04 | 0.04 |
| L33 | 23 | 63.19 | 42.70 | 6.25 | −29.10 |

Single lens data

| Lens | Start surface | Focal length |
|---|---|---|
| 1 | 1 | 346.33 |
| 2 | 3 | 231.18 |
| 3 | 5 | −56.96 |
| 4 | 6 | 130.12 |
| 5 | 8 | 78.90 |
| 6 | 10 | −86.70 |
| 7 | 13 | 90.07 |
| 8 | 15 | 54.77 |
| 9 | 16 | −32.56 |
| 10 | 18 | 36.50 |
| 11 | 19 | −28.48 |
| 12 | 21 | −54.44 |
| 13 | 23 | 51.39 |
| 14 | 25 | −25.57 |
| 15 | 26 | 36.50 |
| 16 | 28 | 34.10 |
| 17 | 29 | −44.91 |
| G | 31 | 0.00 |

β of rear side of each lens in the first lens unit during focusing on an infinite object
$\beta_2$ = 1.411928 (Lateral magnification of the surface numbers of 3 to 32)
$\beta_3$ = 3.543524 (Lateral magnification of the surface numbers of 5 to 32)
$\beta_4$ = 0.931654 (Lateral magnification of the surface numbers of 8 to 32)
Combined focal length of the first lens unit and the second lens unit
$f_{12}$ = 302.90

Numerical Example 10 f = 584.99 mm Fno = 4.12 2ω = 4.24

Surface data

| Surface number | r | d | nd | vd | Effective diameter |
|---|---|---|---|---|---|
| 1(aspherical) | 1425.908 | 12.50 | 1.48749 | 70.2 | 141.99 |
| 2 | −309.210 | 0.50 | | | 141.96 |
| 3 | 124.343 | 16.80 | 1.43387 | 95.1 | 134.79 |
| 4 | 369.366 | 88.48 | | | 133.16 |
| 5 | 100.180 | 4.20 | 1.88300 | 40.8 | 76.89 |
| 6(diffractive) | 46.871 | 11.71 | 1.49700 | 81.5 | 68.63 |
| 7 | 94.112 | 55.55 | | | 67.36 |
| 8 | 453.421 | 5.00 | 1.48749 | 70.2 | 54.27 |
| 9 | −303.092 | 0.10 | | | 53.63 |
| 10(aspherical) | −46082.357 | 5.00 | 1.48749 | 70.2 | 53.05 |
| 11 | −169.963 | 3.00 | | | 52.22 |
| 12 | 958.750 | 3.00 | 1.57099 | 50.8 | 48.94 |
| 13 | 72.538 | 50.00 | | | 46.35 |
| 14(stop) | ∞ | 11.00 | | | 34.83 |
| 15 | 123.637 | 2.00 | 1.83481 | 42.7 | 31.84 |
| 16 | 60.357 | 6.46 | 1.48749 | 70.2 | 31.39 |
| 17 | −138.474 | 3.00 | | | 31.52 |
| 18 | 96.197 | 4.24 | 1.75520 | 27.5 | 31.21 |
| 19 | −97.470 | 1.70 | 1.69680 | 55.5 | 30.91 |
| 20 | 43.008 | 5.91 | | | 29.83 |
| 21 | −105.633 | 2.00 | 1.69680 | 55.5 | 30.24 |
| 22 | 107.699 | 4.00 | | | 31.21 |
| 23 | 90.998 | 5.25 | 1.61340 | 44.3 | 34.04 |
| 24 | −211.886 | 3.00 | | | 34.69 |
| 25 | −88.893 | 2.00 | 1.59282 | 68.6 | 35.19 |
| 26 | 64.933 | 7.88 | 1.61340 | 44.3 | 37.21 |
| 27 | −93.928 | 0.30 | | | 38.16 |
| 28 | 69.168 | 7.63 | 1.74950 | 35.3 | 39.33 |
| 29 | −87.609 | 2.00 | 1.80809 | 22.8 | 39.01 |
| 30 | 128.184 | 5.00 | | | 38.40 |
| 31 | ∞ | 2.00 | 1.51633 | 64.1 | 38.59 |
| 32 | ∞ | | | | 38.66 |

Aspherical surface data
First surface

K = 0.00000e+000    A4 = −2.38242e−008    A6 = −1.07500e−013
A8 = 1.96345e−017   A10 = −1.44101e−021

Tenth surface

K = −5.83493e+006   A4 = 1.98187e−007     A6 = 7.15901e−011
A8 = 1.00934e−015   A10 = 7.73846e−018

Sixth surface (Diffractive surface)

C2 = −3.89607e−005   C4 = −2.55335e−009   C6 = −9.69247e−014
C8 = −9.17547e−015   C10 = 1.98506e−017   C12 = −1.61546e−020
C14 = 2.56719e−024   C16 = 3.97713e−027   C18 = −2.30592e−030
C20 = 3.23739e−034

Various kinds of data
Zoom ratio 1.00

| | |
|---|---|
| Focal length | 584.99 |
| F-number | 4.12 |
| Angle of field | 2.12 |
| Image height | 21.64 |
| Total lens length | 420.00 |
| BF | 88.78 |
| Entrance pupil position | 1251.01 |
| Exit pupil position | −68.05 |
| Front side principal point position | −345.98 |
| Rear side principal point position | −496.21 |

-continued f = 584.99 mm Fno = 4.12 2ω = 4.24

Lens unit data

| Unit | Start surface | Focal length | Lens configuration Length | Front side principal point Position | Rear side principal point position |
|---|---|---|---|---|---|
| L1 | 1 | 238.01 | 199.85 | 146.21 | −154.17 |
| L1A | 1 | 232.89 | 29.80 | 4.82 | −15.60 |
| L1B | 5 | −231.15 | 15.91 | 16.65 | 6.02 |
| L1C | 8 | 181.87 | 10.10 | 4.53 | −2.34 |
| L2 | 12 | −137.61 | 3.00 | 2.07 | 0.16 |
| L12 | 1 | 556.74 | 205.85 | −498.05 | −372.32 |
| L3 | 14 | 2630.44 | 75.37 | 261.46 | 222.26 |
| L31 | 14 | 221.30 | 19.46 | 13.86 | −2.63 |
| L32 | 18 | −48.31 | 13.85 | 9.10 | −1.56 |
| L33 | 23 | 71.92 | 35.06 | 5.14 | −19.38 |

Single lens data

| Lens | Start surface | Focal length |
|---|---|---|
| 1 | 1 | 522.49 |
| 2 | 3 | 423.25 |
| 3 | 5 | −104.41 |
| 4 | 6 | 171.18 |
| 5 | 8 | 373.45 |
| 6 | 10 | 349.93 |
| 7 | 12 | −137.61 |
| 8 | 15 | −143.32 |
| 9 | 16 | 87.15 |
| 10 | 18 | 64.72 |
| 11 | 19 | −42.61 |
| 12 | 21 | −76.24 |
| 13 | 23 | 104.47 |
| 14 | 25 | −62.99 |
| 15 | 26 | 63.79 |
| 16 | 28 | 52.67 |
| 17 | 29 | −64.13 |
| G | 31 | 0.00 |

β of rear side of each lens in the first lens unit during focusing on an infinite object
$\beta_2$ = 1.119630 (Lateral magnification of the surface numbers of 3 to 32)
$\beta_3$ = 2.511903 (Lateral magnification of the surface numbers of 5 to 32)
$\beta_4$ = 1.293097 (Lateral magnification of the surface numbers of 8 to 32)
$\beta_5$ = 1.868973 (Lateral magnification of the surface numbers of 10 to 32)
Combined focal length of the first lens unit and the second lens unit
$f_{12}$ = 556.74

TABLE 1

| | | NUMERICAL EXAMPLE | | | | |
|---|---|---|---|---|---|---|
| | | 1 | 2 | 3 | 4 | 5 |
| CONDITIONAL EXPRESSION | (1) | −1.07 | −0.70 | −1.08 | −0.86 | −1.06 |
| | (2) | 0.77 | 0.72 | 1.18 | 0.63 | 0.78 |
| | (3) | 1.33 | 1.16 | 0.75 | 2.04 | 1.28 |
| | (4) | 0.93 | 1.16 | 0.67 | 0.52 | 0.95 |
| | (5) | 0.46 | 0.47 | 0.40 | 0.57 | 0.45 |
| | (6) | 1.18 | 1.20 | 0.94 | 0.77 | 1.18 |
| | (7) | 2.59 | 3.44 | 4.93 | 1.22 | 1.30 |
| | (8) | 1.02 | 0.83 | 0.89 | 1.29 | 1.00 |
| | (9) | 0.46 | 0.76 | 0.65 | 0.91 | 0.49 |
| | (10) | 0.15 | 0.14 | 0.25 | 0.20 | 0.15 |
| | (11) | −0.233 | −0.152 | −0.305 | −0.195 | −0.230 |
| | (12) | 1.19 | 2.13 | 1.42 | 2.38 | 1.28 |
| | (13) | 21.5 | 14.7 | 24.0 | 23.1 | 21.8 |

TABLE 1-continued

| | | NUMERICAL EXAMPLE | | | | |
|---|---|---|---|---|---|---|
| | | 6 | 7 | 8 | 9 | 10 |
| CONDITIONAL EXPRESSION | (1) | −1.12 | −1.07 | −0.90 | −0.77 | −0.97 |
| | (2) | 0.84 | 0.78 | 0.91 | 0.65 | 0.76 |
| | (3) | 1.21 | 1.31 | 0.98 | 1.75 | 1.28 |
| | (4) | 1.13 | 0.92 | 0.80 | 0.62 | 0.95 |
| | (5) | 0.49 | 0.45 | 0.05 | 0.56 | 0.44 |
| | (6) | 1.18 | 1.19 | 1.00 | 0.81 | 1.20 |
| | (7) | 2.12 | 2.61 | 7.08 | 2.67 | 2.61 |
| | (8) | 1.01 | 1.02 | 0.90 | 1.14 | 0.98 |
| | (9) | 0.69 | 0.46 | 2.28 | 0.52 | 0.50 |
| | (10) | 0.17 | 0.15 | 0.66 | 0.21 | 0.15 |
| | (11) | −0.201 | −0.236 | −0.194 | −0.177 | −0.235 |
| | (12) | 1.89 | 1.16 | 1.29 | 1.50 | 1.23 |
| | (13) | 86.8 | 21.5 | 19.9 | — | 21.9 |

(DESCRIPTION "—" MEANS A CONDITIONAL EXPRESSION WHICH IS NOT APPLIED TO THE NUMERICAL EXAMPLE.)

Next, referring to FIG. 11, an image pickup apparatus (a camera system) to which the optical system of the present embodiment is applied will be described. FIG. 11 is a schematic configuration diagram of a single-lens reflex camera. In FIG. 11, reference numeral 10 denotes an image pickup lens that includes the image pickup optical system 1 (the optical system) in anyone of Embodiments 1 to 10. The image pickup optical system 1 is held on a barrel 2 that is a holding member. Reference numeral 20 denotes a camera body. The camera body 20 includes a quick return mirror 3 that reflects a light beam from the image pickup lens 10 upwardly, a focusing glass 4 that is disposed at an image forming position of the image pickup lens 10, and a penta-dach prism 5 that converts an inverse image formed on the focusing glass 4 into an erected image. The camera body 20 also includes an eyepiece lens 6 that is used to observe the erected image, and the like.

Reference numeral 7 denotes a photo-sensitive surface, and an image pickup element (a photoelectric conversion element) such as a CCD sensor or a CMOS sensor or a silver salt film is disposed on the photo-sensitive surface 7. At the time of taking an image, the quick return mirror 3 is removed from an optical path and an image is formed on the photo-sensitive surface 7 by the image pickup lens 10. The image pickup optical system 1 of the present embodiment can also be applied to an image pickup apparatus which is not provided with the quick return mirror 3. Thus, applying the image pickup optical system 1 of each of Embodiments 1 to 10 to a photographic camera or an image pickup apparatus such as a video camera or a digital still camera, an image pickup apparatus with high optical performance that is easily manufactured and that is lightweight can be provided.

This application claims the benefit of Japanese Patent Application No. 2011-233190, filed on Oct. 24, 2011, which is hereby incorporated by reference herein in its entirety.

What is claimed is:

1. An optical system comprising:
in order from an object side to an image side,
a first lens unit configured to be fixed during a focusing operation, the first lens unit having a positive refractive power as a whole;
a second lens unit configured to move in an optical axis direction during the focusing operation, the second lens unit having a negative refractive power as a whole; and
a third lens unit positioned at the image side relative to the second lens unit, the third lens unit having a positive or negative refractive power as a whole,
wherein the first lens unit is, in order from the object side to the image side, configured by a first partial lens unit, a second partial lens unit, and a third partial lens unit, wherein the first partial lens unit is configured by two positive lens components, wherein the second partial lens unit is configured by one cemented lens having a negative combined refractive power configured by cementing at least one positive lens and one negative lens, or configured by one positive lens and one negative lens having a negative combined refractive power, wherein the third partial lens unit is positioned between the second partial lens unit and the second lens unit, the third partial lens unit having a positive refractive power as a whole, and wherein following conditional expressions are met:

$$0.20 < f_1 \times L \times Fno/f^2 < 1.30$$

$$0.50 < \left| \prod_{i=1}^{L1num} \beta_i \right| \times \frac{L}{f} < 9.00$$

where f is a focal length of a total system during focusing on infinity, $f_1$ is a focal length of the first lens unit, $f_{1A}$ is a focal length of the first partial lens unit, L is a length from an apex of a surface closest to the object side of the optical system to an image plane, Fno is a full open F-number when focusing on an infinite object, L1num is a sum of a number of lens components from the first partial lens unit to the second partial lens unit, and $\beta_i$ is a combined lateral magnification of all lenses at the image side relative to an i-th lens component in order from the object side when focusing on the infinite object.

2. The optical system according to claim 1, wherein following conditional expressions are met:

$$0.40 < f_{1A}/f_{1C} < 2.50$$

$$-3.00 < f_{1B}/f_1 < -0.20$$

$$0.60 < f_{1A}/f_1 < 2.00$$

$$0.50 < f_{1C}/f_1 < 2.50$$

where $f_{1A}$ is a focal length of the first partial lens unit, $f_{1B}$ is a focal length of the second partial lens unit, and $f_{1C}$ is a focal length of the third partial lens unit.

3. The optical system according to claim 1, wherein following conditional expressions are met:

$$0.20 < f_{12}/f < 3.00$$

$$0.10 < d_{1AB}/d_1 < 0.80$$

where $f_{12}$ is a combined focal length of the first lens unit and the second lens unit when focusing on the infinity, $d_1$ is a distance on an optical axis from an apex of a surface at the object side of a lens positioned closest to the object side of the first lens unit to an apex of a surface at the image side of a lens positioned closest to the image side of the first lens unit, and $d_{1AB}$ is an interval between the first partial lens unit and the second partial lens unit.

4. An optical system comprising:

in order from an object side to an image side, a first lens unit configured to be fixed during a focusing operation, the first lens unit having a positive refractive power as a whole;

a second lens unit configured to move in an optical axis direction during the focusing operation, the second lens unit having a negative refractive power as a whole; and a third lens unit positioned at the image side relative to the second lens unit, the third lens unit having a positive or negative refractive power as a whole, wherein the first lens unit is, in order from the object side to the image side, configured by a first partial lens unit, a second partial lens unit, and a third partial lens unit, wherein the first partial lens unit is configured by two positive lens components, wherein the second partial lens unit is configured by one cemented lens having a negative combined refractive power configured by cementing at least one positive lens and one negative lens, or configured by one positive lens and one negative lens having a negative combined refractive power, wherein the third partial lens unit is positioned between the second partial lens unit and the second lens unit, the third partial lens unit having a positive refractive power as a whole, and wherein following conditional expressions are met:

$$-3.00 < f_{1B}/f_1 < -0.20$$

$$0.50 < f_{1C}/f_1 < 2.50$$

$$0.40 < f_{1A}/f_{1C} < 2.50$$

$$0.20 < f_{12}/f < 3.00$$

$$0.10 < d_{1AB}/d_1 < 0.80$$

where f is a focal length of a total system when focusing on infinity, $f_1$ is a focal length of the first lens unit, $f_{1A}$ is a focal length of the first partial lens unit, $f_{1B}$, is a focal length of the second partial lens unit, $f_{1C}$ is a focal length of the third partial lens unit, $f_{12}$ is a combined focal length of the first lens unit and the second lens unit when focusing on the infinity, $d_1$ is a distance on an optical axis from an apex of a surface at the object side of a lens positioned closest to the object side of the first lens unit to an apex of a surface at the image side of a lens positioned closest to the image side of the first lens unit, and $d_{1AB}$ is an interval between the first partial lens unit and the second partial lens unit.

5. The optical system according to claim 1, wherein a following conditional expression is met:

$$0.08 < d_{1A}/d_1 < 0.60$$

where $d_{1A}$ is a distance on the optical axis from an apex of a surface at the object side of a lens closest to the object side of the first partial lens unit to an apex of a surface at the image side of a lens closest to the image side of the first partial lens unit.

6. The optical system according to claim 4, wherein following conditional expressions are met:

$$-0.500 < f_2/f < -0.050$$

$$0.50 < f_{G1}/f_{G2} < 3.00$$

where $f_2$ is a focal length of the second lens unit, $f_{G1}$ is a focal length of a positive lens component at the object side of the two positive lens components of the first partial lens unit, and $f_{G2}$ is a focal length of a positive lens component at the image side of the two positive lens components of the first partial lens unit.

7. The optical system according to claim 4, wherein the first lens unit includes at least one diffractive optical element, and wherein a following conditional expression is met:

$$5.0 < f_{DOE}/f < 200.0$$

where $f_{DOE}$ is a focal length only by a diffraction component of the diffractive optical element.

8. The optical system according to claim 4, wherein the third partial lens unit is configured by one positive lens component.

9. The optical system according to claim 4, wherein the second partial lens unit is configured by one cemented lens.

10. The optical system according to claim 4, wherein the first partial lens unit is configured by two positive lenses.

11. The optical system according to claim 4, wherein at least a positive lens component at the image side of the two positive lens components of the first partial lens unit has a convex meniscus shape at the object side.

12. The optical system according to claim 11, wherein a following conditional expression is met:

$$0.20 < (ML_{R2} - ML_{R1})/(ML_{R2} + ML_{R1}) < 0.95$$

where $ML_{R1}$ is a radius of curvature of a surface contacting air which is closest to the object side and $ML_{R2}$ is a radius of curvature of a surface contacting the air which is closest to the image side in the positive lens component having the meniscus shape of the first partial lens unit.

13. An image pickup apparatus comprising:
an optical system including:
in order from an object side to an image side,
a first lens unit configured to be fixed during a focusing operation, the first lens unit having a positive refractive power as a whole;
a second lens unit configured to move in an optical axis direction during the focusing operation, the second lens unit having a negative refractive power as a whole; and
a third lens unit positioned at the image side relative to the second lens unit, the third lens unit having a positive or negative refractive power as a whole,
wherein the first lens unit is, in order from the object side to the image side, configured by a first partial lens unit, a second partial lens unit, and a third partial lens unit,
wherein the first partial lens unit is configured by two positive lens components,
wherein the second partial lens unit is configured by one cemented lens having a negative combined refractive power configured by cementing at least one positive lens and one negative lens, or configured by one positive lens and one negative lens having a negative combined refractive power,
wherein the third partial lens unit is positioned between the second partial lens unit and the second lens unit, the third partial lens unit having a positive refractive power as a whole, and
wherein following conditional expressions are met:

$$-3.00 < f_{1B}/f_1 < -0.20$$

$$0.50 < f_{1C}/f_1 < 2.50$$

$$0.40 < f_{1A}/f_{1C} < 2.50$$

$$0.20 < f_{12}/f < 3.00$$

$$0.10 < d_{1AB}/d_1 < 0.80$$

where f is a focal length of a total system when focusing on infinity, $f_1$ is a focal length of the first lens unit, $f_{1A}$ is a focal length of the first partial lens unit, $f_{1B}$ is a focal length of the second partial lens unit, $f_{1C}$ is a focal length of the third partial lens unit, $f_{12}$ is a combined focal length of the first lens unit and the second lens unit when focusing on the infinity, $d_1$ is a distance on an optical axis from an apex of a surface at the object side of a lens positioned closest to the object side of the first lens unit to an apex of a surface at the image side of a lens positioned closest to the image side of the first lens unit, and $d_{1AB}$ is an interval between the first partial lens unit and the second partial lens unit; and an image pickup element configured to receive light formed by the optical system.

14. The image pickup apparatus according to claim 13, wherein a following conditional expression is met:

$$0.08 < d_{1A}/d_1 < 0.60$$

where $d_{1A}$ is a distance on the optical axis from an apex of a surface at the object side of a lens closest to the object side of the first partial lens unit to an apex of a surface at the image side of a lens closest to the image side of the first partial lens unit.

15. The image pickup apparatus according to claim 13, wherein following conditional expressions are met:

$$-0.500 < f_2/f < -0.050$$

$$0.50 < f_{G1}/f_{G2} < 3.00$$

where $f_2$ is a focal length of the second lens unit, $f_{G1}$ is a focal length of a positive lens component at the object side of the two positive lens components of the first partial lens unit, and $f_{G2}$ is a focal length of a positive lens component at the image side of the two positive lens components of the first partial lens unit.

16. The image pickup apparatus according to claim 13, wherein the first lens unit includes at least one diffractive optical element, and
wherein a following conditional expression is met:

$$5.0 < f_{DOE}/f < 200.0)$$

where $f_{DOE}$ is a focal length only by a diffraction component of the diffractive optical element.

17. The image pickup apparatus according to claim 13, wherein the third partial lens unit is configured by one positive lens component.

18. The image pickup apparatus according to claim 13, wherein the second partial lens unit is configured by one cemented lens.

19. The image pickup apparatus according to claim 13, wherein at least a positive lens component at the image side of the two positive lens components of the first partial lens unit has a convex meniscus shape at the object side.

20. The image pickup apparatus according to claim 19, wherein a following conditional expression is met:

$$0.20 < (ML_{R2} - ML_{R1})/(ML_{R2} + ML_{R1}) < 0.95$$

where $ML_{R1}$ is a radius of curvature of a surface contacting air which is closest to the object side and $ML_{R2}$ is a radius of curvature of a surface contacting the air which is closest to the image side in the positive lens component having the meniscus shape of the first partial lens unit.

* * * * *